United States Patent
Wu et al.

(10) Patent No.: US 12,126,438 B2
(45) Date of Patent: Oct. 22, 2024

(54) METHOD AND DEVICE IN UE AND BASE STATION USED FOR WIRELESS COMMUNICATION

(71) Applicants: Keying Wu, Shanghai (CN); Xiaobo Zhang, Shanghai (CN); Lin Yang, Shanghai (CN)

(72) Inventors: Keying Wu, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 176 days.

(21) Appl. No.: 17/979,776

(22) Filed: Nov. 3, 2022

(65) Prior Publication Data

US 2023/0055347 A1 Feb. 23, 2023

Related U.S. Application Data

(63) Continuation of application No. 17/156,658, filed on Jan. 25, 2021, now Pat. No. 11,552,729, which is a (Continued)

(30) Foreign Application Priority Data

Sep. 5, 2018 (CN) .......................... 201811031506.3

(51) Int. Cl.
*H04L 1/00* (2006.01)
*H04L 5/00* (2006.01)
(Continued)

(52) U.S. Cl.
CPC .......... *H04L 1/0038* (2013.01); *H04L 5/0053* (2013.01); *H04L 5/0094* (2013.01); *H04L 27/2676* (2013.01); *H04W 72/23* (2023.01)

(58) Field of Classification Search
CPC ... H04L 1/0038; H04L 5/0053; H04L 5/0094; H04L 27/2676; H04L 5/0007;
(Continued)

(56) References Cited

U.S. PATENT DOCUMENTS

| 2017/0208627 A1 | 7/2017 | You et al. |
| 2018/0124744 A1 | 5/2018 | Xue |
| 2018/0199268 A1 | 7/2018 | Wang et al. |
| 2018/0234969 A1 | 8/2018 | Wang |

FOREIGN PATENT DOCUMENTS

| CN | 101505498 A | 8/2009 |
| CN | 102215586 A | 10/2011 |

(Continued)

OTHER PUBLICATIONS

ISR in application PCT/CN2019/103346 dated Nov. 4, 2019.
(Continued)

*Primary Examiner* — Charles C Jiang
*Assistant Examiner* — Shawn D Miller

(57) ABSTRACT

The present disclosure provides a method and a device in a User Equipment (UE) and a base station for wireless communications. A UE receives first information, the first information being used for indicating M DCI blind decoding(s); monitors a first-type radio signal respectively on each of S sub-band(s) in a first time-domain resource; and performs at most M1 DCI blind decoding(s) of the M DCI blind decoding(s) on the S sub-band(s) in the first time-domain resource. Herein, the first-type radio signal detected on the S sub-band(s) is used for determining the M1 DCI blind decoding(s) out of the M DCI blind decoding(s). The above method allows the base station to make dynamic adjust-
(Continued)

ments to the UE's blind decoding on PDCCH resources according to LBT results, ensuring that sufficient PDCCH resources are available and not too many PDSCH resources are preempted, and that excessive blind decodings can be avoided.

20 Claims, 28 Drawing Sheets

Related U.S. Application Data continuation of application No. PCT/CN2019/103346, filed on Aug. 29, 2019.

(51) Int. Cl.
*H04L 27/26* (2006.01)
*H04W 72/23* (2023.01)

(58) Field of Classification Search
CPC ....... H04L 5/0092; H04L 1/0052; H04L 1/00; H04L 1/0072; H04W 72/23; H04W 72/044; Y02D 30/70
See application file for complete search history.

(56) References Cited

FOREIGN PATENT DOCUMENTS

| WO | 2011047506 A1 | 4/2011 |
|---|---|---|
| WO | 2013022451 A1 | 2/2013 |

OTHER PUBLICATIONS

Wilus Inc."Discussion on Contents for Group-Common PDCCH for NR" 3GPPTSGRAN WGI NRAd-Hoc##2 R1-1711356,Jun. 30, 2017 (Jun. 30, 2017).
The extended European search report in application EP19858130.8 dated Oct. 5, 2021.
First Office Action received in application No. CN201811031506.3 dated Aug. 11, 2021.
First Search Report received in application No. CN201811031506.3dated Aug. 5, 2021.
CN201811031506.3 Notification to Grant Patent Right for Invention dated Jul. 26, 2022.
CN201811031506.3 Supplemental Search Report dated Jan. 5, 2022.
CN201811031506.3 Second Office Action dated Jan. 13, 2022.
CN201811031506.3 Third Office Action dated May 13, 2022.

METHOD AND DEVICE IN UE AND BASE STATION USED FOR WIRELESS COMMUNICATION

CROSS REFERENCE TO RELATED APPLICATIONS

This application is a continuation of the U.S. patent application Ser. No. 17/156,658, filed on Jan. 25, 2021, which is a continuation of International Application No. PCT/CN2019/103346, filed on Aug. 29, 2019, claims the priority benefit of Chinese Patent Application No. 201811031506.3, filed on Sep. 5, 2018, the full disclosure of which is incorporated herein by reference.

BACKGROUND

Technical Field

The present disclosure relates to methods and devices in wireless communication systems, and in particular to a method and device in a wireless communication system that support data transmission on Unlicensed Spectrum.

Related Art

Application scenarios of future wireless communication systems are becoming increasingly diversified, and different application scenarios have different performance demands on systems. In order to meet performance requirements of various application scenarios, a study item (SI) of access to Unlicensed Spectrum under New Radio (NR) was approved at the 3rd Generation Partner Project (3GPP) Radio Access Network (RAN) #75 Plenary meeting, and later at the 3GPP RAN #78 Plenary it was decided that access to Unlicensed Spectrum is supported in NR Release 15.

In the project of License Assisted Access (LAA) in Long Term Evolution (LTE), a transmitter (a base station or a User Equipment) shall perform Listen Before Talk (LBT) before transmitting data on Unlicensed Spectrum to ensure that no interference is incurred on other ongoing wireless transmissions on Unlicensed Spectrum. According to discussions at the 3GPP RANI #92bis conference, LBT is measured by 20 MHz in a NR-Unlicensed spectrum (NR-U) system.

SUMMARY

Inventors find through researches that in an NR-U system whose bandwidth comprises multiple 20 MHz, an LBT performed based on a measurement unit of 20 MHz will lead to dynamic changes in available bands and bandwidths of the system. To better adapt to such bands with dynamic changes, a base station configures Physical Downlink Control CHannel (PDCCH) resources for a User Equipment (UE) on each 20 MHz band to avoid the situation where a certain UE cannot be served due to LBT failures on some 20 MHz bands. The UE only needs to monitor PDCCH resources on available bands to conserve power consumption, and PDCCH resources that require monitoring on each 20 MHz band can be adjusted dynamically according to the number of available bands so as to guarantee a fixed number of blind decodings. Therefore, it is urgent for the UE to determine which bands pass LBT and how to make dynamic adjustments to PDCCH monitoring.

To address the above problem, the present disclosure provides a solution. It should be noted that when there is no conflict, embodiments of the UE in the present disclosure and characteristics in the embodiments can be applied to the base station and vice versa. The embodiments of the present disclosure and the characteristics in the embodiments may be mutually combined if no conflict is incurred.

The present disclosure provides a method in a UE for wireless communications, comprising:

receiving first information, the first information being used for indicating M DCI blind decoding(s);

monitoring a first-type radio signal respectively on each sub-band of S sub-band(s) in a first time-domain resource; and performing at most M1 DCI blind decoding(s) of the M DCI blind decoding(s) on the S sub-band(s) in the first time-domain resource;

herein, the first-type radio signal detected on the S sub-band(s) is used for determining the M1 DCI blind decoding(s) out of the M DCI blind decoding(s); M is a positive integer, M1 is a positive integer no greater than M, and S is a positive integer.

In one embodiment, a problem to be solved in the present disclosure is how the UE determines on which Radio Resource Control (RRC) configured PDCCH resources to perform blind decoding in the present burst in a wideband NR-U system that comprises multiple sub-bands. The above method manages to solve the problem by indicating such information explicitly or implicitly with the first-type radio signal.

In one embodiment, the above method is characterized in that the S sub-bands respectively correspond to different LBTs, and the first-type radio signal is transmitted only in (a) sub-band(s) of the S sub-bands that has(have) passed LBT. The base station indicates to the UE via the first-type radio signal on which PDCCH resources shall blind decoding be performed.

In one embodiment, the above method is advantageous in that the base station makes dynamic adjustments to blind decoding performed by the UE on PDCCH resources according to LBT results, thereby ensuring that there are sufficient PDCCH resources in each burst and avoiding too many Physical Downlink Shared CHannel (PDSCH) resources being occupied by PDCCH resources, and meanwhile avoiding extra complexity of the UE side brought about as the number of blind decodings of the UE increases with available sub-bands.

In one embodiment, the above method is advantageous in that the UE only needs to perform blind decoding on PDCCH resources indicated by the first-type radio signal rather than on all RRC configured PDCCH resources, thus reducing the UE's processing complexity and power consumption.

In one embodiment, the above method is advantageous in indicating PDCCH resources on which blind decoding is required to be performed via the first-type radio signal, which helps reduce signaling overhead.

According to one aspect of the present disclosure, the first information is used for indicating N RE pool(s), any of the N RE pool(s) comprising a positive integer number of RE(s); M RE set(s) is(are) respectively reserved for the M DCI blind decoding(s), and any RE set of the M RE set(s) belongs to one of the N RE pool(s); the M1 DCI blind decoding(s) is(are) respectively performed in M1 RE set(s) of the M RE set(s); any RE set of the M RE set(s) comprises a positive integer number of RE(s); N is a positive integer.

According to one aspect of the present disclosure, comprising:

the first-type radio signal being detected only on S1 sub-band(s) of the S sub-band(s) in the first time-domain resource;

herein, frequency resources occupied by any RE set of the M1 RE set(s) belong to the S1 sub-band(s); S1 being a positive integer no greater than S.

According to one aspect of the present disclosure, the S1 sub-band(s) is(are) used for determining the M1 DCI blind decoding(s) out of the M DCI blind decoding(s).

According to one aspect of the present disclosure, the first-type radio signal detected on the S sub-band(s) comprises a first sequence; the first sequence is used for determining the M1 DCI blind decoding(s) out of the M DCI blind decoding(s).

According to one aspect of the present disclosure, any RE set of the M1 RE set(s) belongs to N1 RE pool(s) of the N RE pool(s); the first-type radio signal detected on the S sub-band(s) is used for determining the N1 RE pool(s) out of the N RE pool(s), or, the first-type radio signal detected on the S sub-band(s) is used for determining a number of RE set(s) comprised in each of the N1 RE pool(s) that belongs (belong) to the M1 RE set(s); N1 is a positive integer no greater than N.

According to one aspect of the present disclosure, comprising at least a former of:
receiving a first signaling; and
receiving a second radio signal, or, transmitting a second radio signal;
herein, the first signaling is received through a DCI blind decoding of the M1 DCI blind decoding(s); and the first signaling comprises scheduling information of the second radio signal.

The present disclosure provides a method in a base station for wireless communications, comprising:
transmitting first information, the first information being used for indicating M DCI blind decoding(s);
performing S access detection(s) respectively on S sub-band(s), the S access detection(s) being used for determining S1 sub-band(s) out of the S sub-band(s); and
transmitting a first-type radio signal only on the S1 sub-band(s) of the S sub-band(s) respectively in a first time-domain resource;
herein, a target receiver of the first information performs at most M1 DCI blind decoding(s) of the M DCI blind decoding(s) on the S sub-band(s) in the first time-domain resource; the first-type radio signal is used for determining the M1 DCI blind decoding(s) out of the M DCI blind decoding(s); M and S are positive integers respectively, while M1 and S1 are positive integers respectively no greater than M and S.

According to one aspect of the present disclosure, the first information is used for indicating N RE pool(s), any of the N RE pool(s) comprising a positive integer number of RE(s); M RE set(s) is(are) respectively reserved for the M DCI blind decoding(s), and any RE set of the M RE set(s) belongs to one of the N RE pool(s); the M1 DCI blind decoding(s) is(are) respectively performed in M1 RE set(s) of the M RE set(s); any RE set of the M RE set(s) comprises a positive integer number of RE(s); N is a positive integer.

According to one aspect of the present disclosure, frequency resources occupied by any RE set of the M1 RE set(s) belong to the S1 sub-band(s).

According to one aspect of the present disclosure, the S1 sub-band(s) is(are) used for determining the M1 DCI blind decoding(s) out of the M DCI blind decoding(s).

According to one aspect of the present disclosure, the first-type radio signal detected on the S sub-band(s) comprises a first sequence; the first sequence is used for determining the M1 DCI blind decoding(s) out of the M DCI blind decoding(s).

According to one aspect of the present disclosure, any RE set of the M1 RE set(s) belongs to N1 RE pool(s) of the N RE pool(s); the first-type radio signal is used for determining the N1 RE pool(s) out of the N RE pool(s), or, the first-type radio signal is used for determining a number of RE set(s) comprised in each of the N1 RE pool(s) that belongs(belong) to the M1 RE set(s); N1 is a positive integer no greater than N.

According to one aspect of the present disclosure, comprising at least a former of:
transmitting a first signaling; and
transmitting a second radio signal, or, receiving a second radio signal;
herein, the first signaling corresponds to a DCI blind decoding of the M1 DCI blind decoding(s); the first signaling comprises scheduling information of the second radio signal.

The present disclosure provides a UE for wireless communications, comprising:
a first receiver, which receives first information, the first information being used for indicating M DCI blind decoding(s);
a second receiver, which monitors a first-type radio signal respectively on each sub-band of S sub-band(s) in a first time-domain resource; and
a first processor, which performs at most M1 DCI blind decoding(s) of the M DCI blind decoding(s) on the S sub-band(s) in the first time-domain resource;
herein, the first-type radio signal detected on the S sub-band(s) is used for determining the M1 DCI blind decoding(s) out of the M DCI blind decoding(s); M is a positive integer, M1 is a positive integer no greater than M, and S is a positive integer.

The present disclosure provides a base station for wireless communications, comprising:
a first transmitter, which transmits first information, the first information being used for indicating M DCI blind decoding(s);
a third receiver, which performs S access detection(s) respectively on S sub-band(s), the S access detection(s) being used for determining S1 sub-band(s) out of the S sub-band(s); and
a second processor, which transmits a first-type radio signal only on the S1 sub-band(s) of the S sub-band(s) respectively in a first time-domain resource;
herein, a target receiver of the first information performs at most M1 DCI blind decoding(s) of the M DCI blind decoding(s) on the S sub-band(s) in the first time-domain resource; the first-type radio signal is used for determining the M1 DCI blind decoding(s) out of the M DCI blind decoding(s); M and S are positive integers respectively, while M1 and S1 are positive integers respectively no greater than M and S.

In one embodiment, the present disclosure has the following advantages over traditional schemes:

In a wideband NR-U system that comprises multiple sub-bands on which LBTs are separately performed, each sub-band is configured with PDCCH resources so as to avoid unsuccessful service to a UE due to LBT failures on some sub-bands.

The base station makes dynamic adjustments to blind decoding performed by the UE on PDCCH resources according to LBT results, so that the adequacy of PDCCH resources can be ensured in each burst and PDSCH resources won't be pre-occupied by PDCCH resources, and that excessive blind decodings of the UE can be avoided.

The UE needs to perform blind decoding only on PDCCH resources on sub-bands that pass LBT instead of all RRC configured PDCCH resources, thereby reducing the UE's processing complexity and power consumption.

PDCCH resources that require blind decoding are indicated by a cell-common or terminal-group-specific downlink radio signal to cut down signaling overhead.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

Embodiment 1

Figure 1:
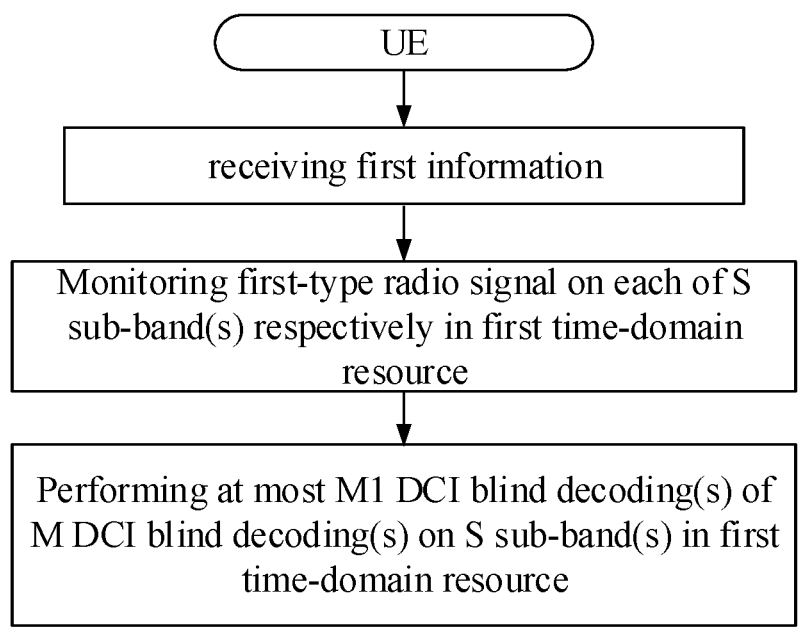
FIG. 1 illustrates a flowchart of first information, a first-type radio signal and M1 DCI blind decoding(s) according to one embodiment of the present disclosure.

Embodiment 1 illustrates a flowchart of first information, a first-type radio signal and M1 DCI blind decoding(s); as shown in FIG. 1.

In Embodiment 1, the UE in the present disclosure receives first information; monitors a first-type radio signal respectively on each sub-band of S sub-band(s) in a first time-domain resource; and performs at most M1 DCI blind decoding(s) of M DCI blind decoding(s) on the S sub-band(s) in the first time-domain resource. Herein, the first information is used for indicating the M DCI blind decoding(s), and the first-type radio signal detected on the S sub-band(s) is used for determining the M1 DCI blind decoding(s) out of the M DCI blind decoding(s); M is a positive integer, M1 is a positive integer no greater than M, and S is a positive integer.

In one embodiment, the DCI refers to Downlink Control Information.

In one embodiment, the first information is carried by a higher layer signaling.

In one embodiment, the first information is carried by an RRC signaling.

In one embodiment, the first information is carried by a Medium Access Control layer Control Element (MAC CE) signaling.

In one embodiment, the first information is carried by a physical layer signaling.

In one embodiment, the first information is an Information Element (IE).

In one embodiment, the first information comprises part of or all information in a PDCCH-Config IE.

In one embodiment, the first information is a PDCCH-Config IE.

In one embodiment, the first information comprises part of or all information in a PDCCH-ConfigCommon IE.

In one embodiment, the first information is a PDCCH-ConfigCommon IE.

In one embodiment, for the specific definition of the PDCCH-Config IE, refer to 3GPP TS 38.331.

In one embodiment, for the specific definition of the PDCCH-ConfigCommon IE, refer to 3GPP TS 38.331.

In one embodiment, the first information comprises first sub-information, the first sub-information indicates the M DCI blind decoding(s).

In one subembodiment, the first sub-information comprises part of or all information in a controlResourceSetToAddModList field of a PDCCH-Config IE.

In one subembodiment, the first sub-information comprises part of or all information in a searchSpacesToAddModList field of a PDCCH-Config IE.

In one subembodiment, the first sub-information comprises part of or all information in a controlResourceSetZero field of a DCCH-ConfigCommon IE.

In one subembodiment, the first sub-information comprises part of or all information in a commonControlResourceSet field of a DCCH-ConfigCommon IE.

In one subembodiment, the first sub-information comprises part of or all information in a searchSpaceZero field of a DCCH-ConfigCommon IE.

In one subembodiment, the first sub-information comprises part of or all information in a commonSearchSpace field of a DCCH-ConfigCommon IE.

In one subembodiment, the first sub-information comprises part of or all information in a searchSpaceType field of a SearchSpace IE.

In one subembodiment, the first sub-information comprises part of or all information in a searchSpaceType field of a SearchSpace IE indicated in a PDCCH-Config IE.

In one subembodiment, the first sub-information comprises part of or all information in a searchSpaceType field of a SearchSpace IE indicated in a DCCH-ConfigCommon IE.

In one embodiment, the first information is UE-specific.

In one embodiment, the first information is transmitted on the S sub-band(s).

In one embodiment, the first information is transmitted on one of the S sub-band(s).

In one embodiment, the first information is transmitted on a band other than the S sub-band(s).

In one embodiment, the first information is transmitted on a band deployed at Unlicensed Spectrum.

In one embodiment, the first information is transmitted on a band deployed at Licensed Spectrum.

In one embodiment, the first-type radio signal detected on the S sub-band(s) is used for determining the M1 DCI blind decoding(s) out of the M DCI blind decoding(s) dynamically.

In one embodiment, the first-type radio signal detected on the S sub-band(s) is used for determining M1 dynamically.

In one embodiment, the first-type radio signal detected on the S sub-band(s) comprises: a characteristic sequence comprised by the first-type radio signal detected on the S sub-band(s) in the first time-domain resource.

In one embodiment, the UE detects the first-type radio signal only on S1 sub-band(s) of the S sub-band(s) in the first time-domain resource, S1 being a positive integer no greater than S; the first-type radio signal detected on the S sub-band(s) comprises S1.

In one embodiment, the UE detects the first-type radio signal only on S1 sub-band(s) of the S sub-band(s) in the first time-domain resource, S1 being a positive integer no greater than S; the first-type radio signal detected on the S sub-band(s) comprises the S1 sub-band(s).

In one embodiment, the UE detects the first-type radio signal only on S1 sub-band(s) of the S sub-band(s) in the first time-domain resource, S1 being a positive integer no greater than S; the first-type radio signal detected on the S sub-band(s) comprises an index of each sub-band of the S1 sub-band(s).

In one embodiment, the UE detects the first-type radio signal only on S1 sub-band(s) of the S sub-band(s) in the first time-domain resource, S1 being a positive integer no greater than S; the first-type radio signal detected on the S sub-band(s) comprises a position of each one of the S1 sub-band(s) in the S sub-band(s).

In one embodiment, any DCI blind decoding performed by the UE on the S sub-band(s) in the first time-domain resource is one of the M1 DCI blind decoding(s).

In one embodiment, a number of DCI blind decoding(s) performed by the UE on the S sub-band(s) in the first time-domain resource does not exceed M1.

In one embodiment, the first-type radio signal is detected on at least one sub-band of the S sub-band(s) in the first time-domain resource.

In one embodiment, the first time-domain resource is a contiguous period.

In one embodiment, S is greater than 1.

In one embodiment, an index of any sub-band of the S sub-band(s) is a SCellIndex.

In one embodiment, an index of any sub-band of the S sub-band(s) is a ServCellIndex.

In one embodiment, an index of any sub-band of the S sub-band(s) is a BWP-Id.

In one embodiment, the monitoring refers to coherent reception, which includes performing coherent reception respectively on each of the S sub-band(s) and measuring energy of a signal obtained by the coherent reception. When the energy of the signal obtained by the coherent reception is larger than a first given threshold on one sub-band of the S sub-band(s), it is determined that the first-type radio signal is detected on the sub-band; when the energy of the signal obtained by the coherent reception is not larger than a first given threshold on one sub-band of the S sub-band(s), it is determined that the first-type radio signal is not detected on the sub-band.

In one embodiment, the monitoring refers to blind detection, which means receiving a signal respectively on each of the S sub-band(s) and performing decoding, if the decoding is determined as correct according to a Cyclic Redundancy Check (CRC) bit on one of the S sub-band(s), it is determined that the first-type radio signal is detected on the sub-band; or if the decoding is determined as incorrect according to a CRC bit on one of the S sub-band(s), it is determined that the first-type radio signal is not detected on the sub-band.

In one embodiment, the monitoring refers to receiving based on energy detection, which means sensing energy of a radio signal respectively on each of the S sub-band(s) and then averaging in time to acquire a received energy. If the received energy is larger than a second given threshold on one of the S sub-band(s), it is determined that the first-type radio signal is detected on the sub-band; or if the received energy is not larger than a second given threshold on one of the S sub-band(s), it is determined that the first-type radio signal is not detected on the sub-band.

In one embodiment, the first information indicates a DCI format corresponding to each DCI blind decoding of the M DCI blind decoding(s).

In one embodiment, each DCI blind decoding of the M DCI blind decoding(s) corresponds to a DCI format.

In one embodiment, at least two of the M DCI blind decodings correspond to different DCI formats.

In one embodiment, at least two of the M DCI blind decodings correspond to a same DCI format.

In one embodiment, for the specific definition of the DCI format, refer to 3GPP TS38.212.

In one embodiment, the first information indicates a Control channel element (CCE) Aggregation Level (AL) corresponding to each DCI blind decoding of the M DCI blind decoding(s).

In one embodiment, each of the M DCI blind decoding(s) corresponds to a CCE AL.

In one embodiment, at least two of the M DCI blind decodings correspond to different CCE ALs.

In one embodiment, at least two of the M DCI blind decodings correspond to a same CCE AL.

In one embodiment, the CCE AL comprises 1, 2, 4, 8 and 16.

In one embodiment, for the specific definition of the CCE AL, refer to 3GPP TS38.213.

In one embodiment, any of the M DCI blind decoding(s) comprises receiving a signal and performing decoding, if the decoding turns out to be correct according to a CRC bit, it is determined that a downlink signaling is received; or if the decoding turns out to be incorrect according to a CRC bit, it is determined that no downlink signaling is received.

In one embodiment, any of the M DCI blind decoding(s) comprises receiving a signal and performing decoding according to a corresponding DCI format; if the decoding turns out to be correct according to a CRC bit, it is determined that a downlink signaling in conformity with the corresponding DCI format is received; or if the decoding turns out to be incorrect according to a CRC bit, it is determined that no downlink signaling in conformity with the corresponding DCI format is received.

In one embodiment, any of the M DCI blind decoding(s) comprises receiving a signal and performing decoding according to a corresponding DCI format and CCE AL; if the decoding turns out to be correct according to a CRC bit, it is determined that a downlink signaling in conformity with the corresponding DCI format is received; or if the decoding turns out to be incorrect according to a CRC bit, it is determined that no downlink signaling in conformity with the corresponding DCI format is received.

In one embodiment, at least one of the M1 DCI blind decoding(s) corresponds to a DCI format that belongs to Format 0_0, Format 1_0, Format 2_0, Format 2_1, Format 2_2 and Format 2_3; at least one of the M DCI blind decodings other than the M1 DCI blind decoding(s) corresponds to a DCI format that is either Format 0_1 or Format 1_1.

In one embodiment, M1 is equal to M.

In one embodiment, M1 is less than M.

In one embodiment, M1 is no greater than 44.

In one embodiment, M1 is no greater than 36.

In one embodiment, M1 is no greater than 22.

In one embodiment, M1 is no greater than 20.

In one embodiment, M1 is one of 44, 36, 22 or 20.

In one embodiment, the first-type radio signal is cell-common.

In one embodiment, the first-type radio signal is specific to a terminal group, which comprises a positive integer number of terminal(s), and the UE is one of the positive integer number of terminal(s).

Embodiment 2

Figure 2:
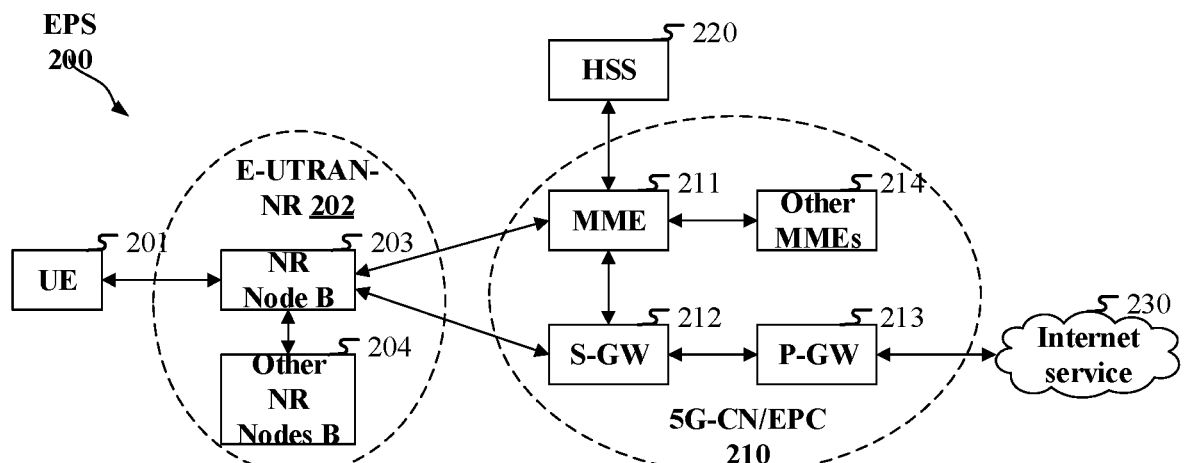
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of Long-Term Evolution (LTE), and Long-Term Evolution Advanced (LTE-A) and future 5G systems. The network architecture 200 of LTE, LTE-A or 5G system may be called an Evolved Packet System (EPS) 200. The EPS 200 may comprise one or more UEs 201, an E-UTRAN-NR 202, a 5G-CoreNetwork/Evolved Packet Core (5G-CN/EPC) 210, a Home Subscriber Server (HSS) 220 and an Internet Service 230. Herein, the UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN-NR 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning System (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, automobile, vehicle or some other appropriate terms. The gNB 203 is connected with the 5G-CN/EPC 210 via an S1 interface. The 5G-CN/EPC 210 comprises a Mobility Management Entity (MME) 211, other MMEs 214, a Service Gateway (S-GW) 212 and a Packet Date Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212; the S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Services.

In one embodiment, the gNB 203 corresponds to the base station in the present disclosure.

In one embodiment, the UE 201 corresponds to the UE in the present disclosure.

In one embodiment, the gNB 203 supports wireless communications with data transmitted on Unlicensed Spectrum.

In one embodiment, the UE 201 supports wireless communications with data transmitted on Unlicensed Spectrum.

Embodiment 3

Figure 3:
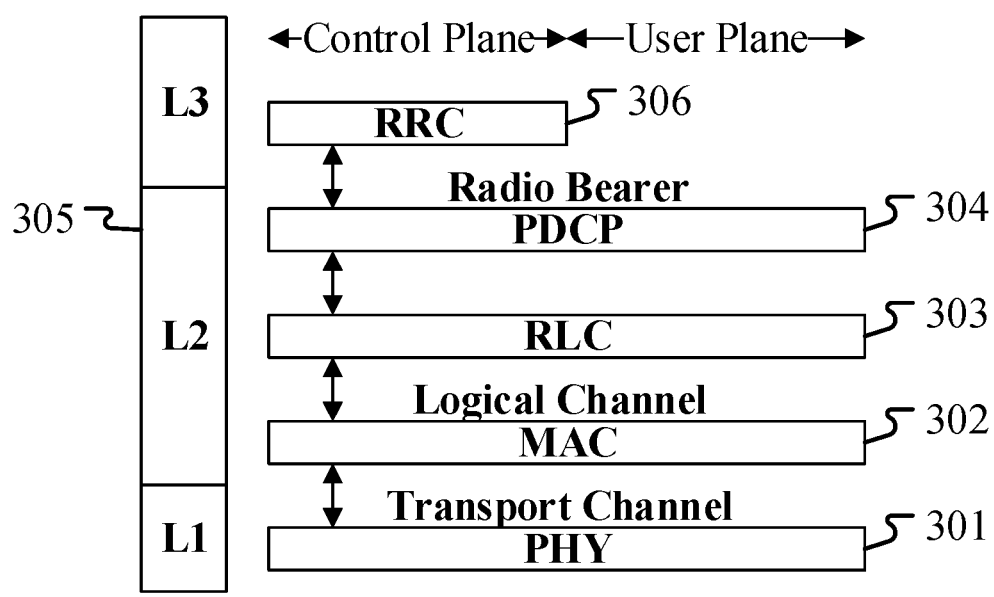
FIG. 3 illustrates a schematic diagram of an example of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first information in the present disclosure is generated by the RRC sublayer 306.

In one embodiment, the first information in the present disclosure is generated by the MAC sublayer 302.

In one embodiment, the first-type radio signal in the present disclosure is generated by the PHY 301.

In one embodiment, the first signaling in the present disclosure is generated by the PHY 301.

In one embodiment, the first signaling in the present disclosure is generated by the MAC sublayer 302.

In one embodiment, the second radio signal in the present disclosure is generated by the PHY 301.

Embodiment 4

Figure 4:
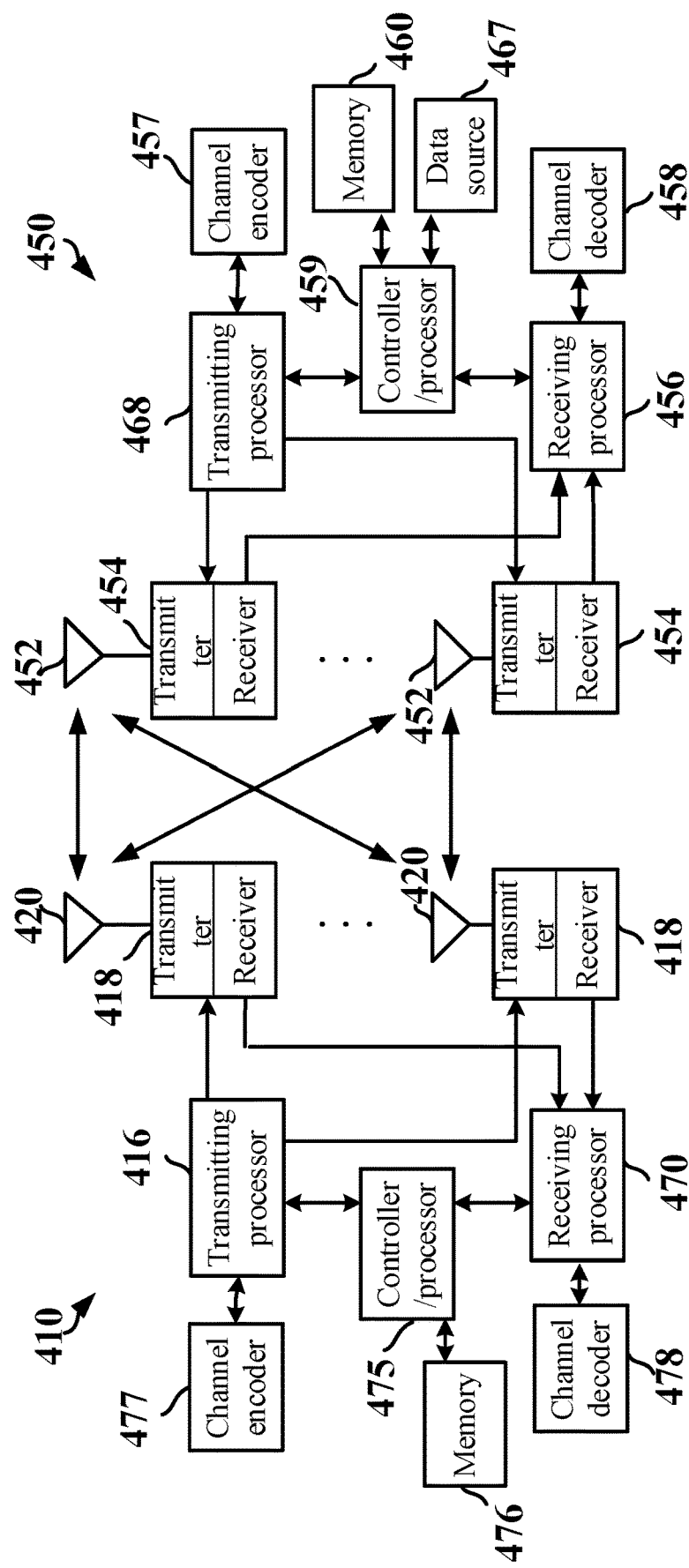
FIG. 4 illustrates a schematic diagram of a New Radio (NR) node and a UE according to one embodiment of the present disclosure.

Embodiment 4 illustrates a schematic diagram of a New Radio (NR) node and a UE, as shown in FIG. 4. FIG. 4 is a block diagram illustrating a UE 450 and a gNB 410 that are in communication with each other in access network.

The gNB 410 comprises a controller/processor 475, a memory 476, a receiving processor 470, a transmitting processor 416, a channel encoder 477, a channel decoder 478, a transmitter/receiver 418 and an antenna 420.

The UE 450 comprises a controller/processor 459, a memory 460, a data source 467, a transmitting processor 468, a receiving processor 456, a channel encoder 457, a channel decoder 458, a transmitter/receiver 454 and an antenna 452.

In downlink (DL) transmission, at the gNB 410, a higher-layer packet from a core network is provided to the controller/processor 475. The controller/processor 475 provides functions of the L2 layer. In DL transmission, the controller/processor 475 provides header compression, encryption, packet segmentation and reordering, and multiplexing between a logical channel and a transport channel, and radio resource allocation for the UE 450 based on various priorities. The controller/processor 475 is also in charge of HARQ operation, retransmission of a lost packet, and a signaling to the UE 450. The transmitting processor 416 and the channel encoder 477 perform signal processing functions used for the L1 layer (that is, PHY). The channel encoder 477 performs coding and interleaving so as to ensure an FEC (Forward Error Correction) at the UE 450 side. The transmitting processor 416 performs mapping to signal clusters corresponding to each modulation scheme (i.e., BPSK, QPSK, M-PSK, M-QAM, etc.) and performs spatial precoding and/or beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. Each transmitter 418 converts a baseband multicarrier symbol stream provided by the transmitting processor 416 into a radio frequency (RF) stream. Each radio frequency stream is later provided to different antennas 420.

In downlink (DL) transmission, at the UE 450, each receiver 454 receives a signal via a corresponding antenna

452. Each receiver 454 recovers information modulated onto the RF carrier, converts the radio frequency stream into a baseband multicarrier symbol stream to be provided to the receiving processor 456. The receiving processor 456 and the channel decoder 458 perform signal processing functions of the L1 layer. The receiving processor 456 converts the baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the receiving processor 456 to recover any UE 450-targeted spatial stream. Symbols on each spatial stream are demodulated and recovered in the receiving processor 456 to generate a soft decision. Then the channel decoder 458 decodes and de-interleaves the soft decision to recover the higher-layer data and control signal transmitted on the physical channel by the gNB 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In DL, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In uplink (UL) transmission, at the UE 450, the data source 467 is used to provide a higher-layer packet to the controller/processor 459. The data source 467 represents all protocol layers above the L2 layer. Similar to a transmitting function of the gNB 410 described in DL transmission, the controller/processor 459 performs header compression, encryption, packet segmentation and reordering, and multiplexing between a logical channel and a transport channel based on radio resource allocation of the gNB 410 so as to provide the L2 layer functions used for the user plane and the control plane. The controller/processor 459 is also responsible for HARQ operation, retransmission of a lost packet, and a signaling to the gNB 410. The channel encoder 457 performs channel coding, and encoded data is through modulation and multi-antenna spatial precoding/beamforming by the transmitting processor 468 to be modulated into multicarrier/single-carrier symbol streams. Then the modulated symbol streams are provided from the transmitter 454 to each antenna 452. Each transmitter 454 first converts a baseband symbol stream provided by the transmitting processor 468 into a radio frequency symbol stream, and then provides the radio frequency symbol stream to the antenna 452.

In uplink (UL) transmission, the function of the gNB 410 is similar to the receiving function of the UE 450 described in DL transmission. Each receiver 418 receives a radio frequency signal via a corresponding antenna 420, converts the received radio frequency signal into a baseband signal, and provides the baseband signal to the receiving processor 470. The receiving processor 470 and the channel decoder 478 collectively provide functions of the L1 layer. The controller/processor 475 provides functions of the L2 layer. The controller/processor 475 can be associated with the memory 476 that stores program code and data. The memory 476 can be called a computer readable medium. In UL transmission, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network. The controller/processor 475 can also perform error detection using ACK and/or NACK protocols to support HARQ operation.

In one embodiment, the UE 450 comprises at least one processor and at least one memory. The at least one memory includes computer program codes. The at least one memory and the computer program codes are configured to be used in collaboration with the at least one processor. The UE 450 at least receives the first information in the present disclosure; monitors the first-type radio signal in the present disclosure respectively on each sub-band of S sub-band(s) in a first time-domain resource in the present disclosure; and performs at most M1 DCI blind decoding(s) of the M DCI blind decoding(s) in the present disclosure on the S sub-band(s) in the first time-domain resource in the present disclosure. Herein, the first information is used for indicating M DCI blind decoding(s), and the first-type radio signal detected on the S sub-band(s) is used for determining the M1 DCI blind decoding(s) out of the M DCI blind decoding(s); M is a positive integer, M1 is a positive integer no greater than M, and S is a positive integer.

In one embodiment, the UE 450 comprises a memory that stores a computer readable instruction program. The computer readable instruction program generates actions when executed by at least one processor. The actions include: receiving the first information in the present disclosure; monitoring the first-type radio signal in the present disclosure respectively on each sub-band of S sub-band(s) in a first time-domain resource in the present disclosure; and performing at most M1 DCI blind decoding(s) of the M DCI blind decoding(s) in the present disclosure on the S sub-band(s) in the first time-domain resource in the present disclosure. Herein, the first information is used for indicating M DCI blind decoding(s), and the first-type radio signal detected on the S sub-band(s) is used for determining the M1 DCI blind decoding(s) out of the M DCI blind decoding(s); M is a positive integer, M1 is a positive integer no greater than M, and S is a positive integer.

In one embodiment, the gNB 410 comprises at least one processor and at least one memory. The at least one memory includes computer program codes. The at least one memory and the computer program codes are configured to be used in collaboration with the at least one processor. The gNB 410 at least transmits the first information in the present disclosure; performs the S access detection(s) in the present disclosure respectively on the S sub-band(s) in the present disclosure; and transmits the first-type radio signal in the present disclosure respectively on the S1 sub-band(s) in a first time-domain resource in the present disclosure. Herein, the first information is used for indicating M DCI blind decoding(s); the S access detection(s) is(are) used for determining the S1 sub-band(s) out of the S sub-band(s); a target receiver of the first information performs at most M1 DCI blind decoding(s) of the M DCI blind decoding(s) on the S sub-band(s) in the first time-domain resource; the first-type radio signal is used for determining the M1 DCI blind decoding(s) out of the M DCI blind decoding(s); M and S are positive integers respectively, while M1 and S1 are positive integers respectively no greater than M and S.

In one embodiment, the gNB 410 comprises a memory that stores a computer readable instruction program. The computer readable instruction program generates actions when executed by at least one processor. The actions include: transmitting the first information in the present disclosure; performing the S access detection(s) in the present disclosure respectively on the S sub-band(s) in the present disclosure; and transmitting the first-type radio signal in the present disclosure respectively on the S1 sub-band(s) in a first time-domain resource in the present disclosure. Herein, the first information is used for indicating M DCI blind decoding(s); the S access detection(s) is(are) used for determining the S1 sub-band(s) out of the S sub-band(s); a target receiver of the first information performs at most M1 DCI blind decoding(s) of the M DCI blind decoding(s) on the S sub-band(s) in the first time-domain resource; the first-type radio signal is used for determining the M1 DCI blind decoding(s) out of the M DCI blind decoding(s); M and S are positive integers respectively, while M1 and S1 are positive integers respectively no greater than M and S.

In one embodiment, the gNB 410 corresponds to the base station in the present disclosure.

In one embodiment, the UE 450 corresponds to the UE in the present disclosure.

In one embodiment, at least one of the antenna 420, the transmitter 418, the transmitting processor 416, the channel encoder 477, the controller/processor 475 or the memory 476 is used for transmitting the first information in the present disclosure; at least one of the antenna 452, the receiver 454, the receiving processor 456, the channel decoder 458, the controller/processor 459, the memory 460 or the data source 467 is used for receiving the first information in the present disclosure.

In one embodiment, at least one of the antenna 420, the transmitter 418, the transmitting processor 416, the channel encoder 477, the controller/processor 475 or the memory 476 is used for transmitting the first-type radio signal respectively on the S1 sub-band(s) in the present disclosure; at least one of the antenna 452, the receiver 454, the receiving processor 456, the channel decoder 458, the controller/processor 459, the memory 460 or the data source 467 is used for monitoring the first-type radio signal respectively on each sub-band of the S sub-band(s) in the present disclosure.

In one embodiment, at least one of the antenna 420, the receiver 418, the receiving processor 470, the channel decoder 478, the controller/processor 475 or the memory 476 is used for performing the S access detection(s) respectively on the S sub-band(s) in the present disclosure.

In one embodiment, at least one of the antenna 452, the receiver 454, the receiving processor 456, the channel decoder 458, the controller/processor 459, the memory 460 or the data source 467 is used for performing at most the M1 DCI blind decoding(s) of the M DCI blind decoding(s) in the present disclosure on the S sub-band(s) in the first time-domain resource in the present disclosure.

In one embodiment, at least one of the antenna 452, the receiver 454, the receiving processor 456, the channel decoder 458, the controller/processor 459, the memory 460 or the data source 467 is used for detecting the first-type radio signal in the present disclosure only on the S1 sub-band(s) of the S sub-band(s) in the present disclosure.

In one embodiment, at least one of the antenna 420, the transmitter 418, the transmitting processor 416, the channel encoder 477, the controller/processor 475 or the memory 476 is used for transmitting the first signaling in the present disclosure; at least one of the antenna 452, the receiver 454, the receiving processor 456, the channel decoder 458, the controller/processor 459, the memory 460 or the data source 467 is used for receiving the first signaling in the present disclosure.

In one embodiment, at least one of the antenna 420, the transmitter 418, the transmitting processor 416, the channel encoder 477, the controller/processor 475 or the memory 476 is used for transmitting the second radio signal in the present disclosure; at least one of the antenna 452, the receiver 454, the receiving processor 456, the channel decoder 458, the controller/processor 459, the memory 460 or the data source 467 is used for receiving the second radio signal in the present disclosure.

In one embodiment, at least one of the antenna 452, the transmitter 454, the transmitting processor 468, the channel encoder 457, the controller/processor 459, the memory 460 or the data source 467 is used for transmitting the second radio signal in the present disclosure; at least one of the antenna 420, the receiver 418, the receiving processor 470, the channel decoder 478, the controller/processor 475 or the memory 476 is used for receiving the second radio signal in the present disclosure.

Embodiment 5

Figure 5:
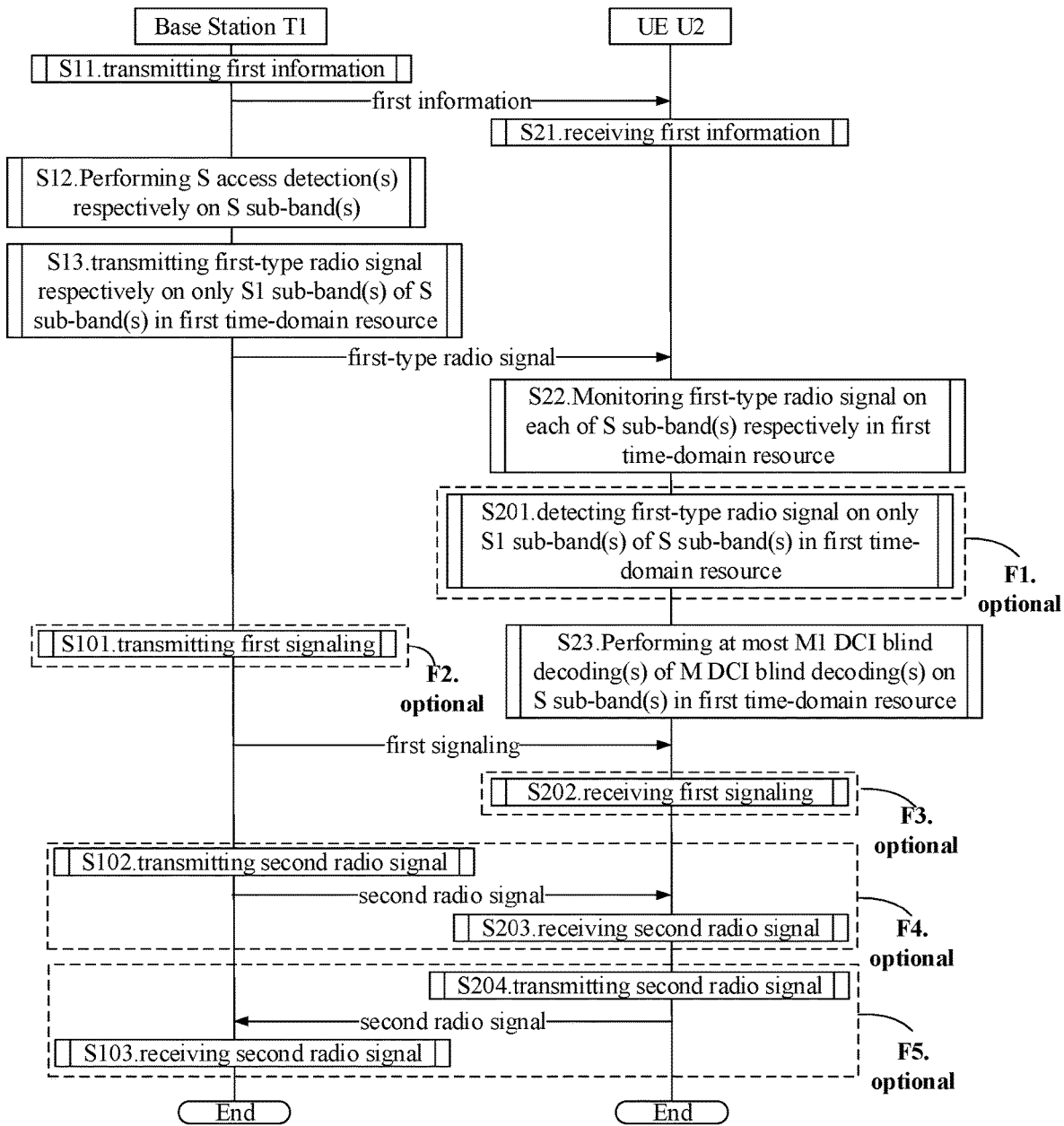
FIG. 5 illustrates a flowchart of wireless transmission according to one embodiment of the present disclosure.

Embodiment 5 illustrates a flowchart of wireless transmission, as shown in FIG. 5. In FIG. 5, a base station T1 is a maintenance base station for a serving cell of a UE U2. In FIG. 5, steps marked by boxes F1-F5 are optional, respectively; the box F4 and the box F5 cannot coexist.

The T1 transmits first information in step S11; performs S access detection(s) respectively on S sub-band(s) in step S12; and transmits a first-type radio signal respectively on S1 sub-band(s) of the S sub-band(s) in a first time-domain resource in step S13; transmits a first signaling in step S101; transmits a second radio signal in step S102; and receives a second radio signal in step S103.

The U2 receives first information in step S21; monitors a first-type radio signal respectively on each sub-band of S sub-band(s) in a first time-domain resource in step S22; detects the first-type radio signal only on S1 sub-band(s) of the S sub-band(s) in the first time-domain resource in step S201; and performs at most M1 DCI blind decoding(s) of M DCI blind decoding(s) on the S sub-band(s) in the first time-domain resource in step S23; receives a first signaling in step S202; receives a second radio signal in step S203; and transmits a second radio signal in step S204.

In Embodiment 5, the first information is used for indicating the M DCI blind decoding(s); the S access detection(s) is(are) used by the T1 for determining the S1 sub-band(s) out of the S sub-band(s); the first-type radio signal detected on the S sub-band(s) is used by the U2 for determining the M1 DCI blind decoding(s) out of the M DCI blind decoding(s); M is a positive integer, M1 is a positive integer no greater than M, S is a positive integer, and S1 is a positive integer no greater than S. The first signaling is received through a DCI blind decoding of the M1 DCI blind decoding(s). The first signaling comprises scheduling information of the second radio signal.

In one embodiment, S1 access detection(s) of the S access detection(s) is(are) respectively used for determining that each of the S1 sub-band(s) is idle, the S1 access detection(s) respectively being performed on the S1 sub-band(s).

In one embodiment, S1 access detection(s) of the S access detection(s) is(are) respectively used for determining that each of the S1 sub-band(s) can be used for transmitting a radio signal, the S1 access detection(s) respectively being performed on the S1 sub-band(s).

In one embodiment, the first information is used for indicating N RE pool(s), any of the N RE pool(s) comprising a positive integer number of RE(s); M RE set(s) is(are) respectively reserved for the M DCI blind decoding(s), and any RE set of the M RE set(s) belongs to one of the N RE pool(s); the M1 DCI blind decoding(s) is(are) respectively performed in M1 RE set(s) of the M RE set(s); any RE set of the M RE set(s) comprises a positive integer number of RE(s); N is a positive integer.

In one embodiment, the phrase that the M RE set(s) is(are) respectively reserved for the M DCI blind decoding(s) means that the M DCI blind decoding(s) is(are) respectively performed in the M RE set(s).

In one embodiment, any of the M blind decoding(s) comprises receiving a signal in a corresponding RE set and performing decoding, if the decoding turns out to be correct according to a CRC bit, it is determined that a downlink signaling is received; if the decoding turns out to be incorrect according to a CRC bit, it is determined that no downlink signaling is received.

In one embodiment, any of the M blind decoding(s) comprises receiving a signal in a corresponding RE set and performing decoding according to a corresponding DCI format and CCE AL, if the decoding turns out to be correct according to a CRC bit, it is determined that a downlink signaling in conformity with the corresponding DCI format is received; or if the decoding turns out to be incorrect according to a CRC bit, it is determined that no downlink signaling in conformity with the corresponding DCI format is received.

In one embodiment, the phrase that the first-type radio signal detected on the S sub-band(s) is used for determining the M1 DCI blind decoding(s) out of the M DCI blind decoding(s) comprises that the first-type radio signal detected on the S sub-band(s) is used for determining M1.

In one embodiment, the phrase that the first-type radio signal detected on the S sub-band(s) is used for determining the M1 DCI blind decoding(s) out of the M DCI blind decoding(s) comprises that the first-type radio signal detected on the S sub-band(s) is used for determining the M1 RE set(s) out of the M RE set(s).

In one embodiment, frequency resources occupied by any RE set of the M1 RE set(s) belong to the S1 sub-band(s).

In one embodiment, the UE in the present disclosure does not detect the first-type radio signal on any sub-band of the S sub-bands other than the S1 sub-band(s).

In one embodiment, the base station in the present disclosure does not transmit the first-type radio signal on any sub-band of the S sub-bands other than the S1 sub-band(s).

In one embodiment, the S1 sub-band(s) is(are) used for determining the M1 DCI blind decoding(s) out of the M DCI blind decoding(s).

In one embodiment, the first-type radio signal detected on the S sub-band(s) comprises a first sequence; the first sequence is used by the U2 for determining the M1 DCI blind decoding(s) out of the M DCI blind decoding(s).

In one embodiment, any RE set of the M1 RE set(s) belongs to N1 RE pool(s) of the N RE pool(s); the first-type radio signal detected on the S sub-band(s) is used by the U2 for determining the N1 RE pool(s) out of the N RE pool(s); N1 is a positive integer no greater than N.

In one embodiment, any RE set of the M1 RE set(s) belongs to N1 RE pool(s) of the N RE pool(s); the first-type radio signal detected on the S sub-band(s) is used by the U2 for determining a number of RE set(s) comprised in each of the N1 RE pool(s) that belongs(belong) to the M1 RE set(s); N1 is a positive integer no greater than N.

In one embodiment, any RE set of the M1 RE set(s) belongs to N1 RE pool(s) of the N RE pool(s); the first-type radio signal detected on the S sub-band(s) is used by the U2 for determining the N1 RE pool(s) out of the N RE pool(s), and also for determining a number of RE set(s) comprised in each of the N1 RE pool(s) that belongs(belong) to the M1 RE set(s); N1 is a positive integer no greater than N.

In one embodiment, the first sequence indicates a number of RE set(s) comprised in each RE pool of the N1 RE pool(s).

In one embodiment, the second radio signal is transmitted on the S1 sub-band(s).

In one embodiment, the second radio signal is transmitted on one of the S1 sub-band(s).

In one embodiment, the second radio signal is transmitted on a band other than the S1 sub-band(s).

In one embodiment, the UE receives the first signaling and then the second radio signal.

In one embodiment, the UE receives the first signaling and transmits the second radio signal.

In one embodiment, the UE receives the first signaling, but does not receive or transmit the second radio signal.

In one embodiment, scheduling information of the second radio signal comprises at least one of time-domain resources occupied, frequency-domain resources occupied, a Modulation and Coding Scheme (MCS), configuration information of DeModulation Reference Signals (DMRS), a Hybrid Automatic Repeat reQuest (HARQ) process number, a Redundancy Version (RV), a New Data Indicator (NDI), corresponding Spatial Tx parameters or corresponding Spatial Rx parameters.

In one embodiment, the configuration information of DMRS comprises one or more of time-domain resources occupied, frequency-domain resources occupied, code-domain resources occupied, an RS sequence, a mapping mode, a DMRS type, a cyclic shift, or an Orthogonal Cover Code (OCC).

In one embodiment, the first information is transmitted on a downlink physical layer data channel (i.e., a downlink channel capable of carrying physical layer data).

In one embodiment, the downlink physical layer data channel is a PDSCH.

In one embodiment, the downlink physical layer data channel is a short PDSCH (sPDSCH).

In one embodiment, the downlink physical layer data channel is a New Radio PDSCH (NR-PDSCH).

In one embodiment, the downlink physical layer data channel is a Narrow Band PDSCH (NB-PDSCH).

In one embodiment, the first-type radio signal is transmitted on a downlink physical layer control channel (i.e., a downlink channel only capable of carrying a physical layer signaling).

In one embodiment, the physical layer control channel is a PDCCH.

In one embodiment, the physical layer control channel is a short PDCCH (sPDCCH).

In one embodiment, the physical layer control channel is a New Radio PDCCH (NR-PDCCH).

In one embodiment, the physical layer control channel is a Narrow Band PDCCH (NB-PDCCH).

In one embodiment, the first signaling is transmitted on a downlink physical layer control channel (i.e., a downlink channel only capable of carrying a physical layer signaling).

In one embodiment, the second radio signal is transmitted on a downlink physical layer data channel (i.e., a downlink channel capable of carrying physical layer data).

In one embodiment, the second radio signal is transmitted on an uplink physical layer data channel (i.e., an uplink channel capable of carrying physical layer data).

In one subembodiment, the uplink physical layer data channel is a Physical Uplink Shared CHannel (PUSCH).

In one subembodiment, the uplink physical layer data channel is a short PUSCH (sPUSCH).

In one subembodiment, the uplink physical layer data channel is a New Radio PUSCH (NR-PUSCH).

In one subembodiment, the uplink physical layer data channel is a Narrow Band PUSCH (NB-PUSCH).

Embodiment 6

Figure 6:
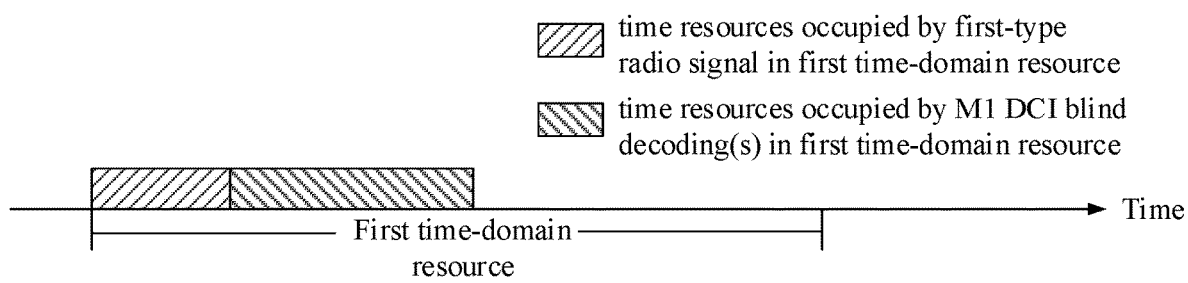
FIG. 6 illustrates a schematic diagram of sequential relations among a first time-domain resource, a first-type radio signal and M1 DCI blind decoding(s) according to one embodiment of the present disclosure.

Embodiment 6 illustrates a schematic diagram of sequential relations among a first time-domain resource, a first-type radio signal and M1 DCI blind decoding(s); as shown in FIG. 6.

In Embodiment 6, the UE in the present disclosure monitors the first-type radio signal respectively on each sub-band of the S sub-band(s) in the present disclosure in the first time-domain resource; and performs at most the M1 DCI blind decoding(s) of the M DCI blind decoding(s) in the present disclosure on the S sub-band(s). In FIG. 6, the box filled with slashes represents time resources occupied by the first-type radio signal in the first time-domain resource, and the box filled with back-slashes represents time resources occupied by the M1 DCI blind decoding(s) in the first time-domain resource.

In one embodiment, the first time-domain resource is a contiguous period.

In one embodiment, the first time-domain resource comprises one or more DownLink (DL) transmission bursts.

In one embodiment, the first time-domain resource comprises one or more DL transmission bursts and one or more UpLink (UL) transmission bursts.

In one embodiment, the first time-domain resource comprises a Channel Occupancy Time (COT).

In one embodiment, length of the first time-domain resource is no greater than a Maximum COT (MCOT).

In one embodiment, length of the first time-domain resource is no greater than $T_{mcot,p}$, the $T_{mcot,p}$ is a MCOT, and the specific meaning of the $T_{mcot,p}$ can be found in 3GPP TS36.213.

In one embodiment, length of the first time-domain resource is no greater than 10 ms.

In one embodiment, length of the first time-domain resource is no greater than 8 ms.

In one embodiment, the first time-domain resource is a slot.

In one embodiment, the first time-domain resource is a positive integer number of slot(s).

In one embodiment, the first time-domain resource is a sub-frame.

In one embodiment, the first time-domain resource is a positive integer number of sub-frame(s).

In one embodiment, an end time for time resources occupied by the first-type radio signal in the first time-domain resource is no later than a start time for time resources occupied by the M1 DCI blind decoding(s).

Embodiment 7

Figure 7:
FIG. 7 illustrates a schematic diagram of sequential relations among a first time-domain resource, a first-type radio signal and M1 DCI blind decoding(s) according to one embodiment of the present disclosure.

Embodiment 7 illustrates a schematic diagram of sequential relations among a first time-domain resource, a first-type radio signal and M1 DCI blind decoding(s); as shown in FIG. 7. In FIG. 7, the box filled with slashes represents time resources occupied by the first-type radio signal and not occupied by the M1 DCI blind decoding(s) in the first time-domain resource, the box filled with back-slashes represents time resources occupied by the M1 DCI blind decoding(s) and not occupied by the first-type radio signal in the first time-domain resource, the cross-filled box represents time resources simultaneously occupied by the M1 DCI blind decoding(s) and the first-type radio signal in the first time-domain resource.

In one embodiment, time resources occupied by the first-type radio signal and time resources occupied by the M1 DCI blind decoding(s) are partially overlapped in the first time domain resource.

Embodiment 8

Figure 8:
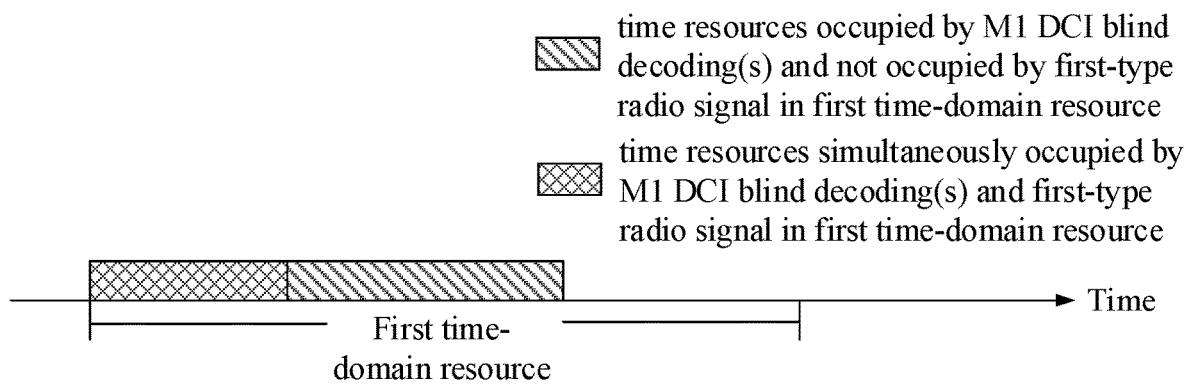
FIG. 8 illustrates a schematic diagram of sequential relations among a first time-domain resource, a first-type radio signal and M1 DCI blind decoding(s) according to one embodiment of the present disclosure.

Embodiment 8 illustrates a schematic diagram of sequential relations among a first time-domain resource, a first-type radio signal and M1 DCI blind decoding(s); as shown in FIG. 8. In FIG. 8, the box filled with back-slashes represents time resources occupied by the M1 DCI blind decoding(s) and not occupied by the first-type radio signal in the first time-domain resource, the cross-filled box represents time resources simultaneously occupied by the M1 DCI blind decoding(s) and the first-type radio signal in the first time-domain resource.

In one embodiment, time resources occupied by the first-type radio signal is located within time resources occupied by the M1 DCI blind decoding(s) in the first time-domain resource.

Embodiment 9

Figure 9:
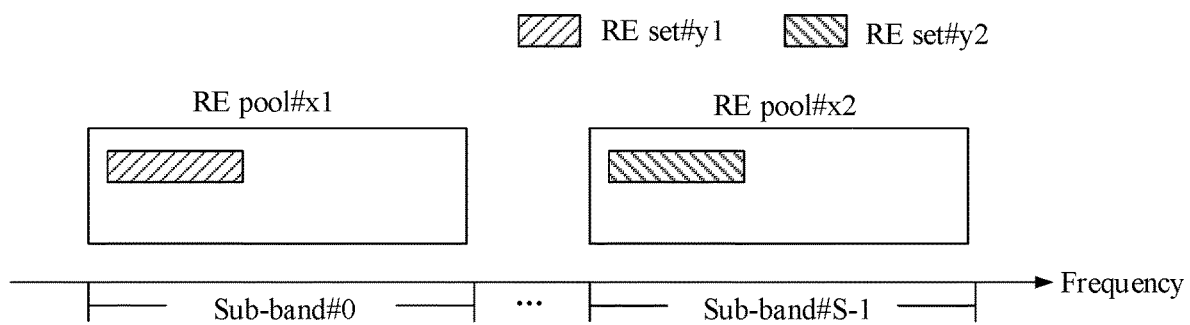
FIG. 9 illustrates a schematic diagram of resource mappings of N RE pool(s) and M RE set(s) in frequency domain according to one embodiment of the present disclosure.

Embodiment 9 illustrates a schematic diagram of resource mappings of N RE pool(s) and M RE set(s) in frequency domain; as shown in FIG. 9.

In Embodiment 9, any RE pool of the N RE pool(s) belongs to the S sub-band(s) in the frequency domain. Any RE set of the M RE set(s) belongs to one of the N RE pool(s); the M RE set(s) is(are) respectively reserved for the M DCI blind decoding(s) in the present disclosure, the M1 DCI blind decoding(s) is(are) respectively performed in M1 RE set(s) of the M RE set(s). Any RE pool of the N RE pool(s) comprises a positive integer number of RE(s), while any RE set of the M RE set(s) comprises a positive integer number of RE(s). In FIG. 9, index(es) of the S sub-band(s) is(are) #0 . . . , and #S−1, respectively; RE set #y1 and RE set #y2 are two RE sets of the M RE sets; RE pool #x1 and RE pool #x2 are two RE pools of the N RE pools; the RE set #y1 and the RE set #y2 respectively belong to the RE pool #x1 and the RE pool #x2; x1 and x2 are respectively non-negative integers less than N, while y1 and y2 are respectively non-negative integers less than M.

In one embodiment, the RE refers to Resource Element.

In one embodiment, the RE occupies a multicarrier symbol in time domain and a subcarrier in frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, N is less than M.

In one embodiment, any one of the N RE pool(s) comprises a positive integer number of RE set(s) out of the M RE set(s).

In one embodiment, at least one of the N RE pool(s) comprises more than one RE set of the M RE sets.

In one embodiment, any one of the N RE pool(s) comprises a positive integer number of RE set(s) out of the M1 RE set(s).

In one embodiment, at least one of the N RE pool(s) does not comprise any RE set of the M1 RE set(s).

In one embodiment, the N RE pool(s) is(are) respectively N COntrol Resource SET(s) (CORESET).

In one embodiment, at least one of the N RE pool(s) is a CORESET.

In one embodiment, the N RE pool(s) is(are) respectively N search space(s).

In one embodiment, at least one of the N RE pool(s) is a search space.

In one embodiment, the N RE pool(s) is(are) respectively N search space set(s).

In one embodiment, at least one of the N RE pool(s) is a search space set.

In one embodiment, at least two RE pools of the N RE pools are two search spaces in a same CORESET.

In one embodiment, at least two RE pools of the N RE pools are two search space sets in a same CORESET.

In one embodiment, any one of the N RE pool(s) is indicated by a SearchSpace IE.

In one embodiment, at least one of the N RE pool(s) is indicated by a SearchSpace IE.

In one embodiment, any one of the N RE pool(s) is indicated by a ControlResourceSet IE.

In one embodiment, at least one of the N RE pool(s) is indicated by a ControlResourceSet IE.

In one embodiment, for the specific definition of the SearchSpace IE, refer to 3GPP TS38.331.

In one embodiment, for the specific definition of the ControlResourceSet IE, refer to 3GPP TS38.331.

In one embodiment, the first information in the present disclosure comprises second sub-information, the second sub-information indicating the N RE pool(s).

In one subembodiment, the second sub-information comprises part of or all information in a controlResourceSetToAddModList field of a PDCCH-Config IE.

In one subembodiment, the second sub-information comprises part of or all information in a searchSpacesToAddModList field of a PDCCH-Config IE.

In one subembodiment, the second sub-information comprises part of or all information in a commonControlResourceSet field of a PDCCH-ConfigCommon IE.

In one subembodiment, the second sub-information comprises part of or all information in a searchSpaceZero field of a PDCCH-ConfigCommon IE.

In one subembodiment, the second sub-information comprises part of or all information in a commonSearchSpace field of a PDCCH-ConfigCommon IE.

In one subembodiment, the second sub-information comprises part of or all information in a searchSpaceSIB1 field of a PDCCH-ConfigCommon IE.

In one subembodiment, the second sub-information comprises part of or all information in a searchSpaceOtherSystemInformation field of a PDCCH-ConfigCommon IE.

In one subembodiment, the second sub-information comprises part of or all information in a pagingSearchSpace field and a ra-SearchSpace field of a PDCCH-ConfigCommon IE.

In one embodiment, any RE pool of the N RE pool(s) belongs to the S sub-band(s) in frequency domain.

In one embodiment, any RE pool of the N RE pool(s) belongs to one of the S sub-band(s) in frequency domain.

In one embodiment, an index of any one of the N RE pool(s) is a ControlResourceSetId.

In one embodiment, an index of at least one of the N RE pool(s) is a ControlResourceSetId.

In one embodiment, an index of any one of the N RE pool(s) is a SearchSpaceId.

In one embodiment, an index of at least one of the N RE pool(s) is a SearchSpaceId.

In one embodiment, for the specific definition of the ControlResourceSetId, refer to 3GPP TS38.331.

In one embodiment, for the specific definition of the SearchSpaceId, refer to 3GPP TS38.331.

In one embodiment, the M RE set(s) is(are) M PDCCH candidate(s).

In one embodiment, for the specific definition of the PDCCH candidate, refer to 3GPP TS38.213 or 3GPP TS36.213.

In one embodiment, at least two RE sets of the M RE sets comprise different numbers of REs.

In one embodiment, at least two RE sets of the M RE sets comprise REs that are partially overlapped.

In one embodiment, at least two RE sets of the M RE sets comprise REs that are mutually orthogonal (that is, non-overlapping).

In one embodiment, for any given RE set of the M RE set(s), an index of the given RE set is a non-negative integer no greater than a number of RE set(s) comprised in an RE pool to which the given RE set belongs.

In one embodiment, an index of any RE set of the M RE set(s) is $m_{s,n_{CI}}$, the $m_{s,n_{CI}}$ being an index of a PDCCH candidate in a search space set indexed by s on a carrier indexed by $n_{CI}$; for the specific definition of the $m_{s,n_{CI}}$, refer to 3GPP TS38.213.

In one embodiment, a pattern of any RE set of the M RE set(s) in an RE pool to which the RE set belongs is determined by the UE in the present disclosure by a method of pre-defining.

In one subembodiment, what the method of pre-defining contains can be found in 3GPP TS38.213.

In one embodiment, a position of each RE comprised in any RE set of the M RE set(s) in an RE pool to which the RE set belongs is determined by the UE by a method of pre-defining.

In one subembodiment, what the method of pre-defining contains can be found in 3GPP TS38.213.

In one embodiment, frequency resources occupied by any RE set of the M1 RE set(s) belong to the S1 sub-band(s) in the present disclosure.

In one embodiment, any one of the M RE sets other than the M1 RE set(s) comprises at least one RE not belonging to the S1 sub-band(s) in the present disclosure in frequency domain.

In one embodiment, at least one of the M RE sets other than the M1 RE set(s) comprises at least one RE not belonging to the S1 sub-band(s) in the present disclosure in frequency domain.

In one embodiment, at least one of the M RE sets other than the M1 RE set(s) belongs to the S1 sub-band(s) in the present disclosure in frequency domain.

In one embodiment, frequency resources occupied by any RE set of the M1 RE set(s) belong to one of the S1 sub-band(s) in the present disclosure.

In one embodiment, frequency resources occupied by any RE set of the M RE set(s) belong to the S sub-band(s).

In one embodiment, frequency resources occupied by any RE set of the M RE set(s) belong to one of the S sub-band(s).

In one embodiment, at least one RE set of the M RE set(s) is consecutive in frequency domain.

Embodiment 10

Figure 10:
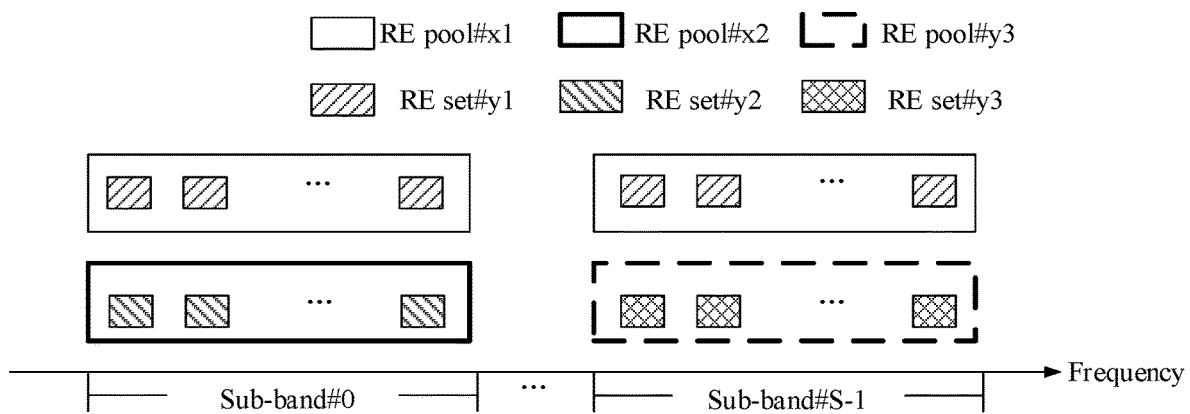
FIG. 10 illustrates a schematic diagram of resource mappings of N RE pool(s) and M RE set(s) in frequency domain according to one embodiment of the present disclosure.

Embodiment 10 illustrates a schematic diagram of resource mappings of N RE pool(s) and M RE set(s) in frequency domain; as shown in FIG. 10. In FIG. 10, index(es) of the S sub-band(s) is(are) #0 . . . , and #S−1, respectively; RE set #y1, RE set #y2 and RE set #y3 are respectively RE sets among the M RE sets; RE pool #x1, RE pool #x2 and RE pool #x3 are respectively RE pools among the N RE pools; the RE set #y1, the RE set #y2 and the RE set #y3 respectively belong to the RE pool #x1, the RE pool #x2 and the RE pool #x3; the numbers x1, x2 and x3 are respectively non-negative integers less than N; the numbers y1, y2 and y3 are respectively non-negative integers less than M.

In one embodiment, frequency resources occupied by at least one of the N RE pool(s) are distributed among multiple sub-bands of the S sub-bands.

In one embodiment, frequency resources occupied by at least one of the M RE set(s) are distributed among multiple sub-bands of the S sub-bands.

In one embodiment, at least one RE set of the M RE set(s) is non-consecutive in frequency domain.

Embodiment 11

Figure 11:
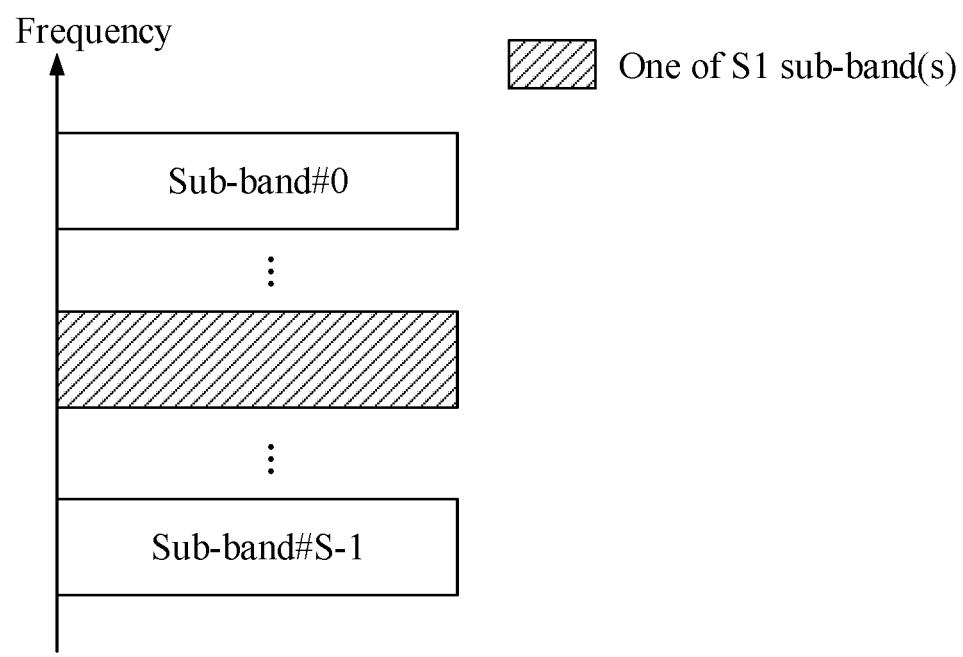
FIG. 11 illustrates a schematic diagram of resource mappings of S sub-band(s) and S1 sub-band(s) in frequency domain according to one embodiment of the present disclosure.

Embodiment 11 illustrates a schematic diagram of resource mappings of S sub-band(s) and S1 sub-band(s) in frequency domain; as shown in FIG. 11.

In Embodiment 11, the UE in the present disclosure monitors the first-type radio signal in the present disclosure respectively on each sub-band of the S sub-band(s), and detects the first-type radio signal only on the S1 sub-band(s) of the S sub-band(s). In FIG. 11, index(es) of the S sub-band(s) is(are) #0 . . . and #S−1, respectively; the box filled with slashes represents one of the S1 sub-band(s).

In one embodiment, each of the S sub-band(s) is deployed at Unlicensed Spectrum.

In one embodiment, any of the S sub-band(s) comprises a carrier.

In one embodiment, any of the S sub-band(s) comprises multiple carriers.

In one embodiment, any of the S sub-band(s) comprises a Bandwidth Part (BWP) in a carrier.

In one embodiment, any of the S sub-band(s) comprises multiple BWPs in a carrier.

In one embodiment, any of the S sub-band(s) is a contiguous frequency-domain part.

In one embodiment, any of the S sub-band(s) comprises a positive integer number of consecutive subcarriers in frequency domain.

In one embodiment, any two sub-bands of the S sub-bands are orthogonal (that is, non-overlapping) in frequency domain.

In one embodiment, any two sub-bands of the S sub-bands are of equal bandwidth.

In one embodiment, at least two sub-bands of the S sub-bands are of unequal bandwidths.

In one embodiment, any of the S sub-band(s) is of a bandwidth of 20 MHz.

In one embodiment, the S sub-bands are consecutive in frequency domain.

In one embodiment, at least two adjacent sub-bands of the S sub-bands are non-consecutive in frequency domain.

In one embodiment, there is a guard period between any two adjacent sub-bands of the S sub-bands in frequency domain.

In one embodiment, an index of any sub-band of the S sub-band(s) is an SCellIndex.

In one embodiment, an index of any sub-band of the S sub-band(s) is a ServCellIndex.

In one embodiment, an index of any sub-band of the S sub-band(s) is a BWP-Id.

In one embodiment, an index of any sub-band of the S sub-band(s) is a positive integer.

In one embodiment, an index of any sub-band of the S sub-band(s) is a positive integer no greater than 31.

In one embodiment, an index of any sub-band of the S sub-band(s) is a non-negative integer.

In one embodiment, an index of any sub-band of the S sub-band(s) is a non-negative integer no greater than 31.

In one embodiment, an index of any sub-band of the S sub-band(s) is a non-negative integer no greater than 4.

In one embodiment, S1 is less than S.

In one embodiment, S1 is equal to S.

Embodiment 12

Figure 12:
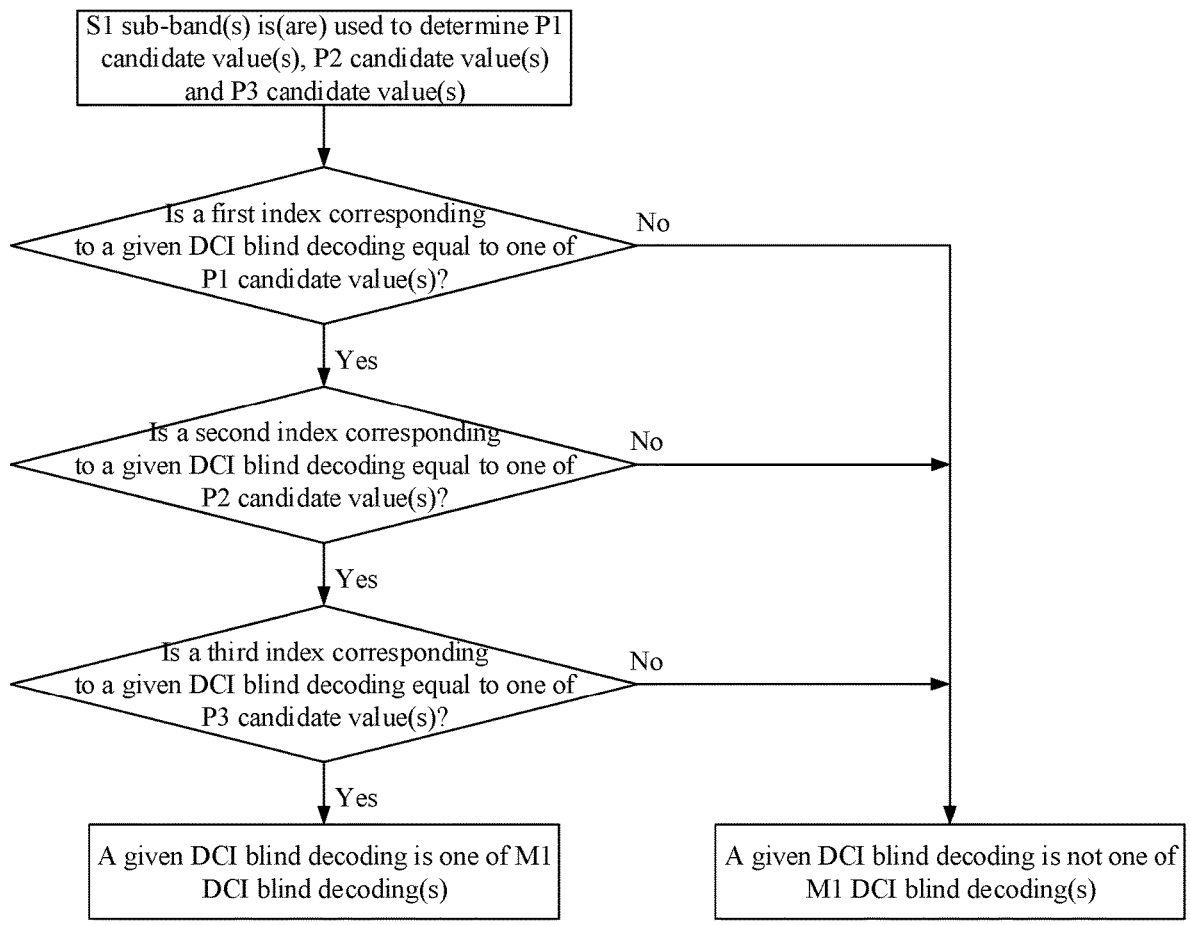
FIG. 12 illustrates a schematic diagram of S1 sub-band(s) being used for determining M1 DCI blind decoding(s) out of M DCI blind decoding(s) according to one embodiment of the present disclosure.

Embodiment 12 illustrates a schematic diagram of S1 sub-band(s) being used for determining M1 DCI blind decoding(s) out of M DCI blind decoding(s); as shown in FIG. 12.

In Embodiment 12, the M DCI blind decoding(s) respectively corresponds(correspond) to M first index(es), M second index(es) and M third index(es). The S1 sub-band(s) is(are) used for determining P1 candidate value(s), P2 candidate value(s) and P3 candidate value(s). For any given DCI blind decoding of the M DCI blind decoding(s), if a first index, a second index and a third index corresponding to the given DCI blind decoding are respectively equal to one of the P1 candidate value(s), one of the P2 candidate value(s) and one of the P3 candidate value(s), the given DCI blind decoding is one of the M1 DCI blind decoding(s); otherwise the given DCI blind decoding is not any of the M1 DCI blind decoding(s).

In one embodiment, the S1 indicates the M1.

In one embodiment, the S1 sub-band(s) indicates(indicate) the M1 DCI blind decoding(s) out of the M DCI blind decoding(s).

In one embodiment, the S1 sub-band(s) indicates(indicate) the M1 RE set(s) out of the M RE set(s) in the present disclosure.

In one embodiment, the S1 sub-band(s) indicates(indicate) the M1 and also the M1 DCI blind decoding(s) out of the M DCI blind decoding(s).

In one embodiment, index(es) of the S1 sub-band(s) indicates(indicate) the M1 DCI blind decoding(s) out of the M DCI blind decoding(s).

In one embodiment, index(es) of the S1 sub-band(s) indicates(indicate) the M1 RE set(s) out of the M RE set(s) in the present disclosure.

In one embodiment, a position of each of the S1 sub-band(s) in the S sub-band(s) indicates the M1 DCI blind decoding(s) out of the M DCI blind decoding(s).

In one embodiment, a position of each of the S1 sub-band(s) in the S sub-band(s) indicates the M1 RE set(s) out of the M RE set(s) in the present disclosure.

In one embodiment, the M1 is related to the S1.

In one embodiment, if the S1 is equal to A1, the M1 is equal to B1; if the S1 is equal to A2, the M1 is equal to B2; A1 is less than A2, and B1 is no greater than B2.

In one embodiment, the M1 is unrelated to the S1.

In one embodiment, the M1 is unrelated to the S1 sub-band(s).

In one embodiment, the M1 is fixed.

In one embodiment, the P1 candidate value(s) is(are) a subset of W1 candidate values, and any first index of the M first index(es) is equal to one of the W1 candidate values.

In one subembodiment, the P1 candidate value(s) is(are) P1 greatest candidate value(s) of the W1 candidate values.

In one subembodiment, the P1 candidate value(s) is(are) P1 smallest candidate value(s) of the W1 candidate values.

In one embodiment, the P2 candidate value(s) is(are) a subset of W2 candidate values, and any second index of the M second index(es) is equal to one of the W2 candidate values.

In one subembodiment, the P2 candidate value(s) is(are) P2 greatest candidate value(s) of the W2 candidate values.

In one subembodiment, the P2 candidate value(s) is(are) P2 smallest candidate value(s) of the W2 candidate values.

In one embodiment, the P3 candidate value(s) is(are) a subset of W3 candidate values, and any third index of the M third index(es) is equal to one of the W3 candidate values.

In one subembodiment, the P3 candidate value(s) is(are) P3 greatest candidate value(s) of the W3 candidate values.

In one subembodiment, the P3 candidate value(s) is(are) P3 smallest candidate value(s) of the W3 candidate values.

In one embodiment, the P1 is equal to the S1, the P1 candidate value(s) being index(es) of the S1 sub-band(s) respectively.

In one embodiment, the S1 is used for determining the P2.

In one embodiment, if the S1 is equal to A1, the P2 is equal to C3; if the S1 is equal to A2, the P2 is equal to C4; A1 is less than A2, and C3 is no greater than C4.

In one embodiment, if the S1 is equal to A1, the P2 is equal to C3; if the S1 is equal to A2, the P2 is equal to C4; A1 is less than A2, and C3 is no less than C4.

In one embodiment, the S1 is used for determining the P3.

In one embodiment, if the S1 is equal to A1, the P3 is equal to C5; if the S1 is equal to A2, the P3 is equal to C6; A1 is less than A2, and C5 is no greater than C6.

In one embodiment, if the S1 is equal to A1, the P3 is equal to C5; if the S1 is equal to A2, the P3 is equal to C6; A1 is less than A2, and C5 is no less than C6.

In one embodiment, any RE set of the M RE set(s) belongs to one of the S sub-band(s) in the present disclosure, and the M first index(es) is(are) index(es) of sub-band(s) to which M corresponding RE set(s) respectively belongs (belong) to.

In one embodiment, the M first index(es) is(are) index(es) of CORESET(s) to which RE set(s) corresponding to the M DCI blind decoding(s) respectively belongs(belong).

In one embodiment, the M second index(es) is(are) index(es) of search space(s) to which RE set(s) corresponding to the M DCI blind decoding(s) respectively belongs (belong).

In one embodiment, the M third index(es) is(are) index(es) of PDCCH candidate(s) to which RE set(s) corresponding to the M DCI blind decoding(s) respectively corresponds(correspond).

In one embodiment, the M second index(es) is(are) index(es) of RE pool(s) to which RE set(s) corresponding to the M DCI blind decoding(s) respectively belongs(belong).

In one embodiment, the M third index(es) is(are) index(es) of RE set(s) respectively corresponding to the M DCI blind decoding(s).

In one embodiment, the P1 candidate value(s) is(are) non-negative integer(s) respectively.

In one embodiment, the P2 candidate value(s) is(are) non-negative integer(s) respectively.

In one embodiment, the P3 candidate value(s) is(are) non-negative integer(s) respectively.

In one embodiment, the M first index(es) is(are) indicated by the first information in the present disclosure.

In one embodiment, the M second index(es) is(are) indicated by the first information in the present disclosure.

In one embodiment, the M third index(es) is(are) indicated by the first information in the present disclosure.

Embodiment 13

Figure 13:
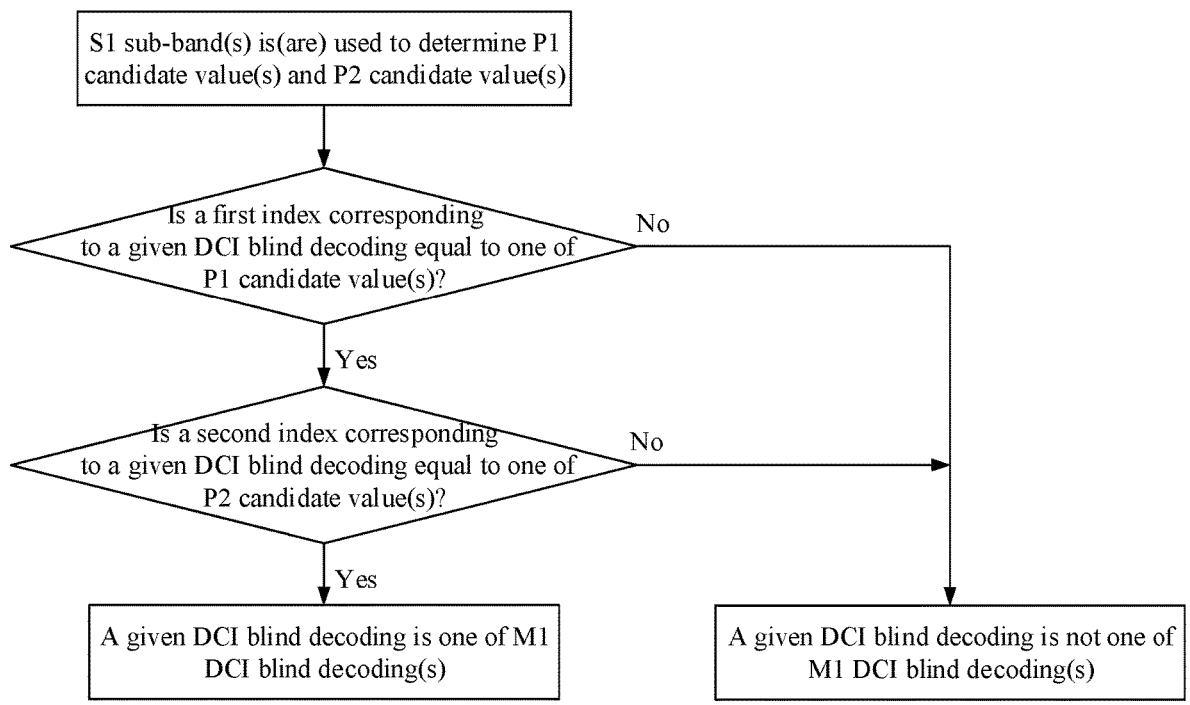
FIG. 13 illustrates a schematic diagram of S1 sub-band(s) being used for determining M1 DCI blind decoding(s) out of M DCI blind decoding(s) according to one embodiment of the present disclosure.

Embodiment 13 illustrates a schematic diagram of S1 sub-band(s) being used for determining M1 DCI blind decoding(s) out of M DCI blind decoding(s); as shown in FIG. 13.

In Embodiment 13, the M DCI blind decoding(s) respectively corresponds(correspond) to M first index(es) and M second index(es). The S1 sub-band(s) is(are) used for determining P1 candidate value(s) and P2 candidate value(s). For any given DCI blind decoding of the M DCI blind decoding(s), if a first index and a second index corresponding to the given DCI blind decoding are respectively equal to one of the P1 candidate value(s) and one of the P2 candidate value(s), the given DCI blind decoding is one of the M1 DCI blind decoding(s); otherwise the given DCI blind decoding is not any of the M1 DCI blind decoding(s).

In one embodiment, the M first index(es) is(are) index(es) of search space(s) to which RE set(s) corresponding to the M DCI blind decoding(s) respectively belongs(belong).

In one embodiment, the M second index(es) is(are) index(es) of PDCCH candidate(s) to which RE set(s) corresponding to the M DCI blind decoding(s) respectively corresponds(correspond).

In one embodiment, the M first index(es) is(are) index(es) of RE pool(s) to which RE set(s) corresponding to the M DCI blind decoding(s) respectively belongs(belong).

In one embodiment, the M second index(es) is(are) index(es) of RE set(s) respectively corresponding to the M DCI blind decoding(s).

Embodiment 14

Figure 14:
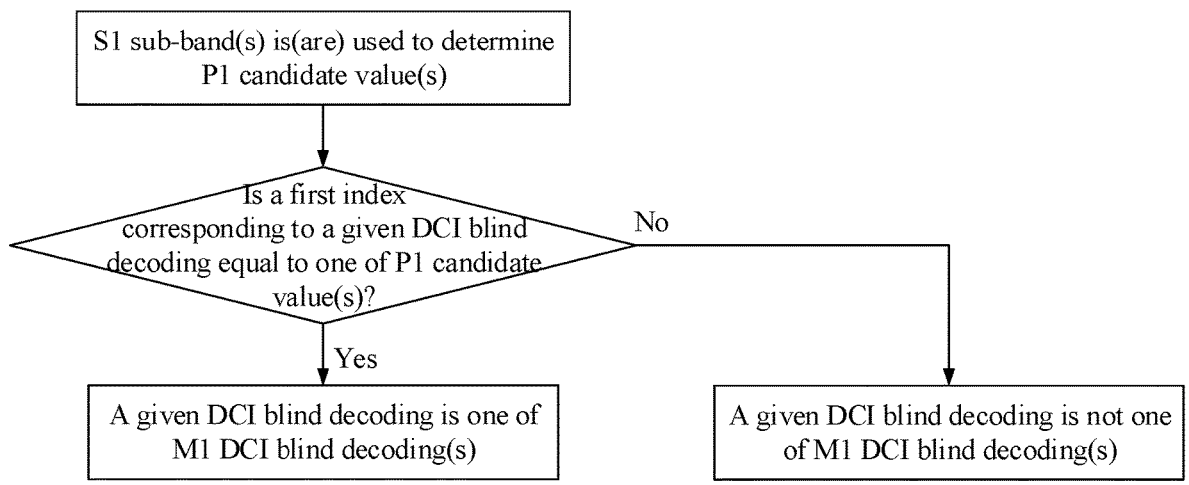
FIG. 14 illustrates a schematic diagram of S1 sub-band(s) being used for determining M1 DCI blind decoding(s) out of M DCI blind decoding(s) according to one embodiment of the present disclosure.

Embodiment 14 illustrates a schematic diagram of S1 sub-band(s) being used for determining M1 DCI blind decoding(s) out of M DCI blind decoding(s); as shown in FIG. 14.

In Embodiment 14, the M DCI blind decoding(s) respectively corresponds(correspond) to M first index(es). The S1 sub-band(s) is(are) used for determining P1 candidate value(s). For any given DCI blind decoding of the M DCI blind decoding(s), if a first index corresponding to the given DCI blind decoding is equal to one of the P1 candidate value(s), the given DCI blind decoding is one of the M1 DCI blind decoding(s); otherwise, the given DCI blind decoding is not any of the M1 DCI blind decoding(s).

In one embodiment, the S1 is used for determining the P1.

In one embodiment, if the S1 is equal to A1, the P1 is equal to C1; if the S1 is equal to A2, the P2 is equal to C2; A1 is less than A2, and C1 is no greater than C2.

In one embodiment, if the S1 is equal to A1, the P1 is equal to C1; if the S1 is equal to A2, the P2 is equal to C2; A1 is less than A2, and C1 is no less than C2.

In one embodiment, the M first index(es) is(are) index(es) of PDCCH candidate(s) to which RE set(s) corresponding to the M DCI blind decoding(s) respectively corresponds(correspond).

In one embodiment, the M first index(es) is(are) index(es) of RE set(s) respectively corresponding to the M DCI blind decoding(s).

Embodiment 15

Figure 15:
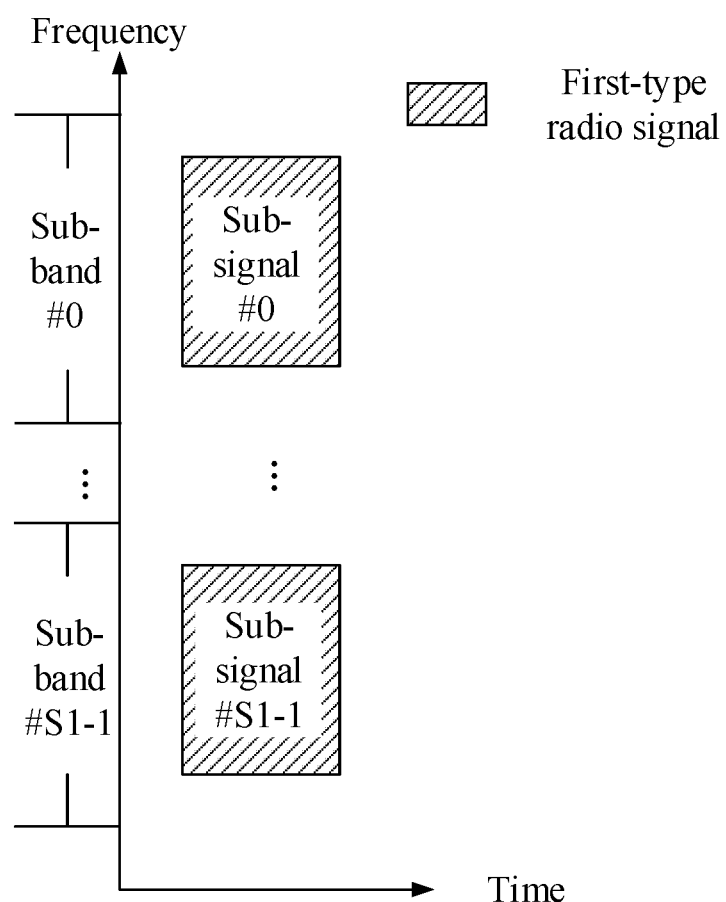
FIG. 15 illustrates a schematic diagram of a first-type radio signal according to one embodiment of the present disclosure.

Embodiment 15 illustrates a schematic diagram of a first-type radio signal; as shown in FIG. 15.

In Embodiment 15, the base station in the present disclosure transmits the first-type radio signal only on the S1 sub-band(s) of the S sub-band(s) respectively in the present disclosure; the UE in the present disclosure detects the first-type radio signal only on the S1 sub-band(s) of the S sub-band(s). The first-type radio signal comprises S1 sub-signal(s), the S1 sub-signal(s) being respectively detected on the S1 sub-band(s). In FIG. 15, index(es) of the S1 sub-band(s) and of the S1 sub-signal(s) is(are) #0 . . . , and S1−1, respectively.

In one embodiment, the first-type radio signal comprises a positive integer number of characteristic sequence(s).

In one subembodiment, the positive integer number of characteristic sequence(s) is(are) pseudo-random sequence(s), respectively.

In one subembodiment, the positive integer number of characteristic sequence(s) is(are) Zadoff-Chu sequence(s), respectively.

In one embodiment, the first-type radio signal comprises a positive integer number of signaling(s).

In one subembodiment, the positive integer number of signaling(s) is(are) physical layer signaling(s), respectively.

In one subembodiment, the positive integer number of signaling(s) is(are) dynamic signaling(s), respectively.

In one subembodiment, an identifier of at least one of the positive integer number of signaling(s) is a Component Carrier-Radio Network Temporary Identifier (CC-RNTI).

In one subembodiment, an identifier of each of the positive integer number of signaling(s) is a CC-RNTI.

In one embodiment, the first-type radio signal comprises a Wake-Up Signal (WUS).

In one embodiment, the first-type radio signal comprises a Discovery Reference Signal (DRS).

In one embodiment, the first-type radio signal comprises a Synchronization Signal (SS).

In one subembodiment, the SS comprises at least one of a Primary SS (PSS) or a Secondary SS (SSS).

In one embodiment, the first-type radio signal comprises a Physical Broadcast Channel (PBCH).

In one embodiment, the first-type radio signal comprises a SS/PBCH Block (SSB).

In one embodiment, the first-type radio signal comprises Channel-State Information Reference Signals (CSI-RS).

In one embodiment, the first-type radio signal comprises DeModulation Reference Signals (DMRS).

In one embodiment, the first-type radio signal comprises fine time/frequency Tracking Reference Signals (TRS).

In one embodiment, the first-type radio signal is cell-common.

In one embodiment, the first-type radio signal is specific to a terminal group, which comprises a positive integer number of terminal(s), and the UE is one of the positive integer number of terminal(s).

In one embodiment, the first-type radio signal comprises S1 sub-signal(s), the S1 sub-signal(s) being respectively detected on the S1 sub-band(s).

In one embodiment, the S1 sub-signal(s) is(are) respectively transmitted on the S1 sub-band(s).

In one embodiment, any sub-signal of the S1 sub-signal(s) does not occupy frequency resources beyond a corresponding sub-band.

In one embodiment, any sub-signal of the S1 sub-signal(s) comprises a characteristic sequence.

In one subembodiment, the characteristic sequence is either a pseudo-random sequence or a Zadoff-Chu sequence.

In one embodiment, at least one of the S1 sub-signal(s) comprises a characteristic sequence.

In one subembodiment, the characteristic sequence is either a pseudo-random sequence or a Zadoff-Chu sequence.

In one embodiment, any sub-signal of the S1 sub-signal(s) comprises a physical layer signaling.

In one embodiment, at least one of the S1 sub-signal(s) comprises a physical layer signaling.

In one embodiment, any sub-signal of the S1 sub-signal(s) comprises a dynamic signaling.

In one embodiment, at least one of the S1 sub-signal(s) comprises a dynamic signaling.

In one embodiment, any sub-signal of the S1 sub-signal(s) comprises a signaling identified by a CC-RNTI.

In one embodiment, at least one of the S1 sub-signal(s) comprises a signaling identified by a CC-RNTI.

Embodiment 16

Figure 16:
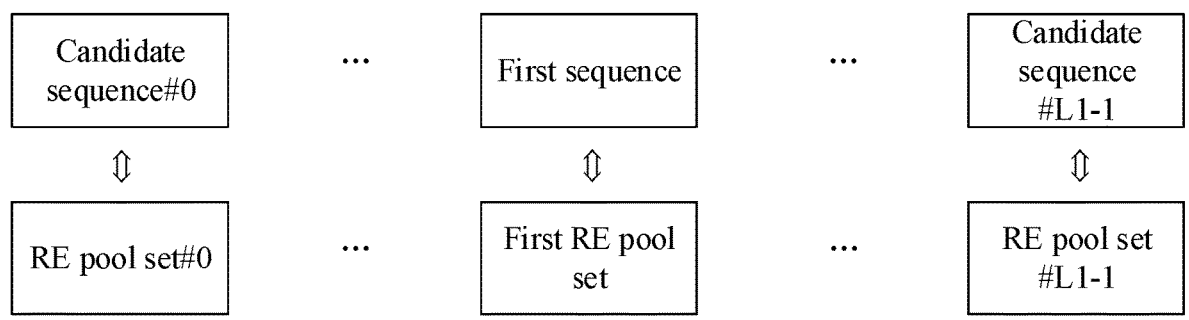
FIG. 16 illustrates a schematic diagram of a first sequence being used for determining M1 DCI blind decoding(s) out of M DCI blind decoding(s) according to one embodiment of the present disclosure.

Embodiment 16 illustrates a schematic diagram of a first sequence being used for determining M1 DCI blind decoding(s) out of M DCI blind decoding(s); as shown in FIG. 16.

In Embodiment 16, the first sequence is a candidate sequence of L1 candidate sequence(s), L1 being a positive integer. The L1 candidate sequence(s) respectively corresponds(correspond) to L1 RE pool set(s), any RE pool set of the L1 RE pool set(s) comprising a positive integer number of RE pool(s) of the N RE pool(s) in the present disclosure. Any RE set corresponding to any one of the M1 DCI blind decoding(s) belongs to an RE pool in a first RE pool set; the first RE pool set is one of the L1 RE pool set(s) corresponding to the first sequence. In FIG. 16, index(es) of the L1 candidate sequence(s) and the L1 RE pool set(s) is(are) #0 . . . , and #L1−1, respectively.

In one embodiment, the first sequence indicates the M1 DCI blind decoding(s) out of the M DCI blind decoding(s).

In one embodiment, the first sequence indicates the M1.

In one embodiment, there is at least one RE pool of the N RE pool(s) that belongs to multiple RE pool sets among the L1 RE pool sets simultaneously.

In one embodiment, DCI blind decodings corresponding to all RE sets in the first RE pool set constitute the M1 DCI blind decodings.

In one embodiment, all RE sets in the first RE pool set constitute the M1 RE sets in the present disclosure.

In one embodiment, any RE pool of the N1 RE pool(s) in the present disclosure is an RE pool in the first RE pool set.

In one embodiment, all RE pools in the first RE pool set constitute the N1 RE pools in the present disclosure.

Embodiment 17

Figure 17:
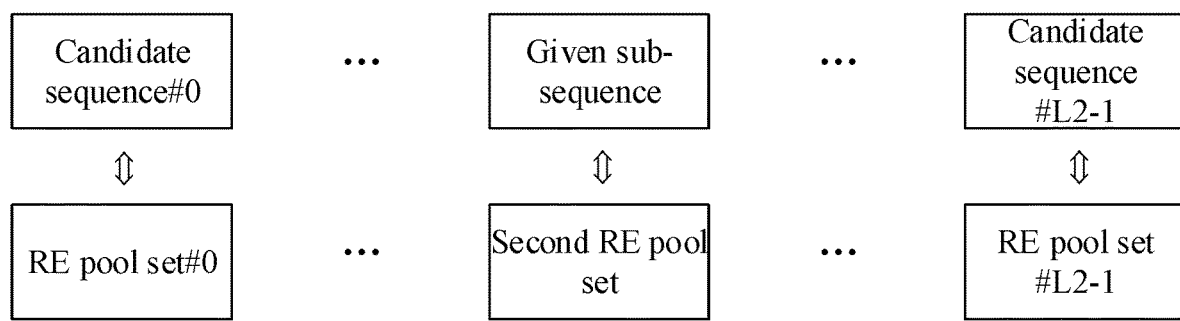
FIG. 17 illustrates a schematic diagram of a first sequence being used for determining M1 DCI blind decoding(s) out of M DCI blind decoding(s) according to one embodiment of the present disclosure.

Embodiment 17 illustrates a schematic diagram of a first sequence being used for determining M1 DCI blind decoding(s) out of M DCI blind decoding(s); as shown in FIG. 17.

In Embodiment 17, the first sequence comprises S1 sub-sequence(s), and the first radio signal comprises S1 sub-signal(s), the S1 sub-signal(s) respectively comprising the S1 sub-sequence(s), and the S1 sub-signal(s) respectively being detected on the S1 sub-band(s) in the present disclosure. For any given sub-band of the S1 sub-band(s), the given sub-band corresponds to a given sub-sequence of the S1 sub-sequence(s). The given sub-sequence is a candidate sequence of L2 candidate sequence(s), L2 being a positive integer. Of the N RE pool(s) in the present disclosure there is(are) only N2 RE pool(s) belonging to the given sub-band in frequency domain, and of the M1 DCI blind decoding(s) there is(are) only M2 DCI blind decoding(s) corresponding to RE set(s) that belongs(belong) to the given sub-band in frequency domain. The L2 candidate sequence(s) respectively corresponds(correspond) to L2 RE pool set(s), any RE pool set of the L2 RE pool set(s) comprising a positive integer number of RE pool(s) of the N2 RE pool(s). Any RE set corresponding to any one of the M2 DCI blind decoding(s) belongs to an RE pool in a second RE pool set; the second RE pool set is one of the L2 RE pool set(s) corresponding to the given sub-sequence. In FIG. 17, index(es) of the L2 candidate sequence(s) and the L2 RE pool set(s) is(are) #0 . . . , and #L2−1, respectively.

In one embodiment, the first sequence comprises S1 sub-sequence(s), and the first radio signal comprises S1 sub-signal(s), the S1 sub-signal(s) respectively comprising the S1 sub-sequence(s), and the S1 sub-signal(s) respectively being detected on the S1 sub-band(s).

In one subembodiment, the S1 sub-sequence(s) is(are) pseudo-random sequence(s), respectively.

In one subembodiment, the S1 sub-sequence(s) is(are) Zadoff-Chu sequence(s), respectively.

In one embodiment, DCI blind decodings corresponding to all RE sets in the second RE pool set constitute all DCI blind decodings performed on the given sub-band out of the M1 DCI blind decodings.

In one embodiment, all RE sets in the second RE pool set constitute RE sets belonging to the given sub-band in frequency domain out of the M1 RE sets in the present disclosure.

In one embodiment, any one of the N1 RE pool(s) in the present disclosure that belongs to the given sub-band in frequency domain is an RE pool in the second RE pool set.

In one embodiment, all RE pools in the second RE pool set constitute RE pools belonging to the given sub-band in frequency domain out of the N1 RE pools in the present disclosure.

Embodiment 18

Figure 18:
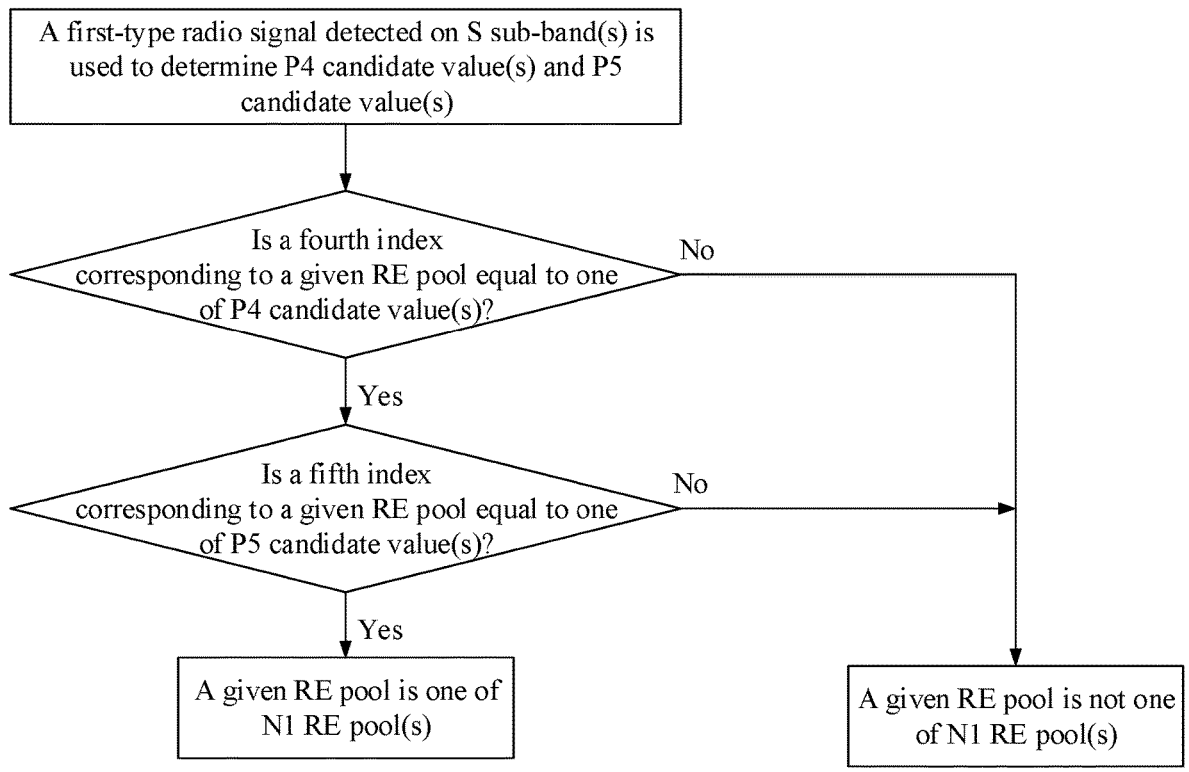
FIG. 18 illustrates a schematic diagram of a first-type radio signal detected on S sub-band(s) being used for determining N1 RE pool(s) out of N RE pool(s) according to one embodiment of the present disclosure.

Embodiment 18 illustrates a schematic diagram of a first-type radio signal detected on S sub-band(s) being used for determining N1 RE pool(s) out of N RE pool(s); as shown in FIG. 18.

In Embodiment 18, the N RE pool(s) respectively corresponds(correspond) to N fourth index(es) and N fifth index(es); the first-type radio signal detected on the S sub-band(s) is used for determining P4 candidate value(s) and P5 candidate value(s). For any given RE pool of the N RE pool(s), if a fourth index and a fifth index corresponding to the given RE pool are respectively equal to one of the P4 candidate value(s) and one of the P5 candidate value(s), the given RE pool is one of the N1 RE pool(s); otherwise the given RE pool is not any one of the N1 RE pool(s).

In one embodiment, the N1 is equal to the N.

In one embodiment, the N1 is less than the N.

In one embodiment, any RE pool of the N1 RE pool(s) belongs to the S1 sub-band(s) in the present disclosure.

In one embodiment, any RE pool of the N1 RE pool(s) belongs to one of the S1 sub-band(s) in the present disclosure.

In one embodiment, any RE set of the M1 RE set(s) in the present disclosure belongs to one of the N1 RE pool(s).

In one embodiment, any one of the N1 RE pool(s) comprises a positive integer number of RE set(s) out of the M1 RE set(s) in the present disclosure.

In one embodiment, at least one of the N1 RE pool(s) comprises at least one RE set that is not any of the M1 RE set(s) in the present disclosure.

In one embodiment, any RE set comprised by any one of the N1 RE pool(s) is an RE set of the M1 RE set(s) in the present disclosure.

In one embodiment, there is a given RE pool in the N1 RE pool(s), comprising a second RE set and a third RE set. The second RE set is one of the M1 RE set(s) in the present disclosure, while the third RE set is not any of the M1 RE set(s) in the present disclosure. A DCI format corresponding to the second RE set is one of Format 0_0, Format 1_0, Format 2_0, Format 2_1, Format 2_2 and Format 2_3; a DCI format corresponding to the third RE set is one of Format 0_1 and Format 1_1.

In one embodiment, the S1 in the present disclosure is used for determining a number of RE set(s) comprised in each of the N1 RE pool(s) that belongs(belong) to the M1 RE set(s).

In one embodiment, for any given RE pool of the N1 RE pool(s), if the S1 is equal to A1, a number of RE set(s) comprised in the given RE pool that belongs(belong) to the M1 RE set(s) is equal to D1; if the S1 is equal to A2, a number of RE set(s) comprised in the given RE pool that belongs(belong) to the M1 RE set(s) is equal to D2; A1 is less than A2, and D1 is no less than D2.

In one embodiment, for any given RE pool of the N1 RE pool(s), if the S1 is equal to A1, a number of RE set(s) comprised in the given RE pool that belongs(belong) to the M1 RE set(s) is equal to D1; if the S1 is equal to A2, a number of RE set(s) comprised in the given RE pool that belongs(belong) to the M1 RE set(s) is equal to D2; A1 is less than A2, and D1 is no greater than D2.

In one embodiment, the N fourth index(es) is(are) respectively ControlResourceSetId(s).

In one embodiment, the N fifth index(es) is(are) respectively SearchSpaceId(s).

In one embodiment, the P4 candidate value(s) is(are) a subset of W4 candidate values, and any fourth index of the N fourth index(es) is equal to one of the W4 candidate values.

In one subembodiment, the P4 candidate value(s) is(are) P4 smallest candidate value(s) of the W4 candidate values.

In one subembodiment, the P4 candidate value(s) is(are) P4 greatest candidate value(s) of the W4 candidate values.

In one embodiment, the P5 candidate value(s) is(are) a subset of W5 candidate values, and any fifth index of the N fifth index(es) is equal to one of the W5 candidate values.

In one subembodiment, the P5 candidate value(s) is(are) P5 smallest candidate value(s) of the W5 candidate values.

In one subembodiment, the P5 candidate value(s) is(are) P5 greatest candidate value(s) of the W5 candidate values.

In one embodiment, the S1 sub-band(s) in the present disclosure is(are) used for determining the P4 candidate value(s).

In one embodiment, the P4 is equal to the S1, the P4 candidate value(s) respectively being index(es) of the S1 sub-band(s) in the present disclosure.

In one embodiment, the S1 in the present disclosure is used for determining the P5.

In one embodiment, if the S1 is equal to A1, the P5 is equal to C9; if the S1 is equal to A2, the P5 is equal to C10; A1 is less than A2, and C9 is no greater than C10.

In one embodiment, if the S1 is equal to A1, the P5 is equal to C9; if the S1 is equal to A2, the P5 is equal to C10; A1 is less than A2, and C9 is no less than C10.

Embodiment 19

Figure 19:
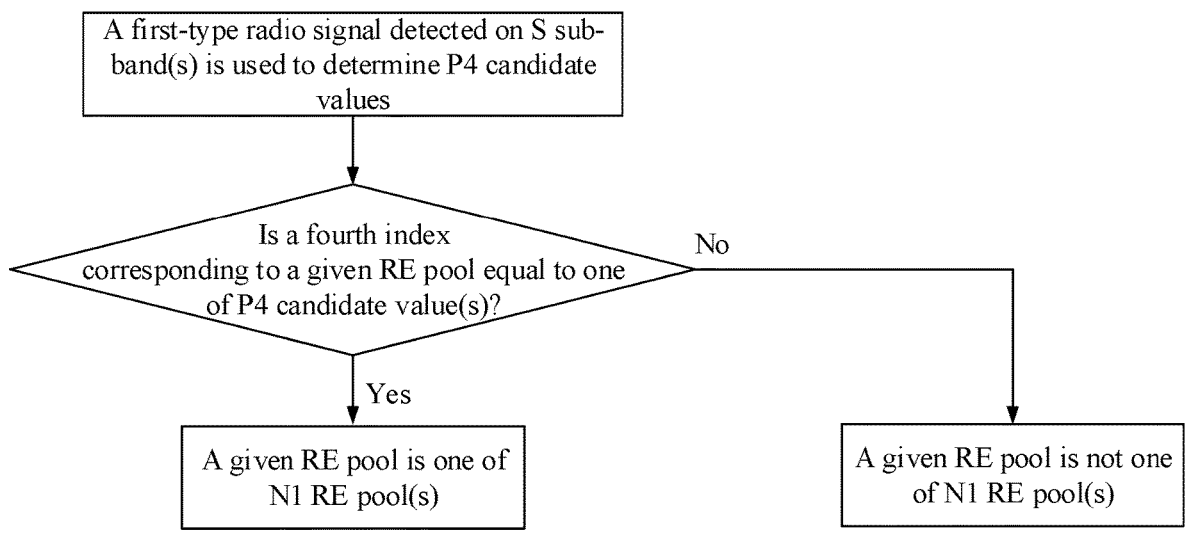
FIG. 19 illustrates a schematic diagram of a first-type radio signal detected on S sub-band(s) being used for determining N1 RE pool(s) out of N RE pool(s) according to one embodiment of the present disclosure.

Embodiment 19 illustrates a schematic diagram of a first-type radio signal detected on S sub-band(s) being used for determining N1 RE pool(s) out of N RE pool(s); as shown in FIG. 19.

In Embodiment 19, the N RE pool(s) respectively corresponds(correspond) to N fourth index(es); the first-type radio signal detected on the S sub-band(s) is used for determining P4 candidate value(s), for any given RE pool of the N RE pool(s), if a fourth index corresponding to the given RE pool is equal to one of the P4 candidate value(s), the given RE pool is an RE pool of the N1 RE pool(s); if a fourth index corresponding to the given RE pool is unequal to one of the P4 candidate value(s), the given RE pool is not any one of the N1 RE pool(s).

In one embodiment, the first-type radio signal detected on the S sub-band(s) indicates the N1 RE pool(s) out of the N RE pool(s).

In one embodiment, the S1 sub-band(s) in the present disclosure indicates the N1 RE pool(s) out of the N RE pool(s).

In one embodiment, the first sequence in the present disclosure indicates the N1 RE pool(s) out of the N RE pool(s).

In one embodiment, the N fourth index(es) is(are) respectively SearchSpaceId(s).

In one embodiment, the S1 is used for determining the P4.

In one embodiment, if the S1 is equal to A1, the P4 is equal to C7; if the S1 is equal to A2, the P4 is equal to C8; A1 is less than A2, and C7 is no greater than C8.

In one embodiment, if the S1 is equal to A1, the P4 is equal to C7; if the S1 is equal to A2, the P4 is equal to C8; A1 is less than A2, and C7 is no less than C8.

Embodiment 20

Figure 20:
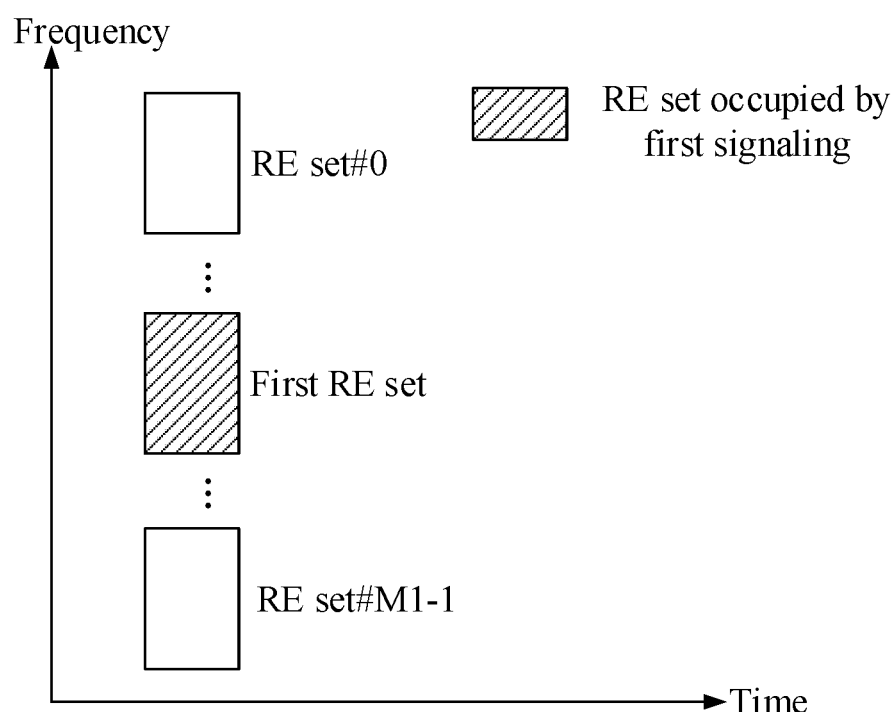
FIG. 20 illustrates a schematic diagram of time-frequency resources occupied by a first signaling according to one embodiment of the present disclosure.

Embodiment 20 illustrates a schematic diagram of time-frequency resources occupied by a first signaling; as shown in FIG. 20.

In Embodiment 20, the first signaling corresponds to a DCI blind decoding of the M1 DCI blind decoding(s) in the present disclosure, and the first signaling is received through the DCI blind decoding of the M1 DCI blind decoding(s). The M1 DCI blind decoding(s) is(are) respectively performed in the M1 RE set(s) in the present disclosure. The first signaling occupies a first RE set of the M1 RE set(s). In FIG. 20, index(es) of the M1 RE set(s) is(are) #0 . . . and #M1−1, respectively; the slash-filled box represents the first RE set.

In one embodiment, at least one of the M1 DCI blind decoding(s) is for a DCI format corresponding to the first signaling.

In one embodiment, at least one of the M1 DCI blind decoding(s) is for a CCE AL corresponding to the first signaling.

In one embodiment, the first signaling is a physical layer signaling.

In one embodiment, the first signaling is a dynamic signaling.

In one embodiment, the first signaling is a dynamic signaling used for DownLink Grant.

In one embodiment, the first signaling is a dynamic signaling used for UpLink Grant.

In one embodiment, the first signaling comprises DCI.

In one embodiment, the first signaling is UE-specific.

In one embodiment, the first signaling is cell-common.

In one embodiment, the first signaling occupies a first RE set of the M1 RE set(s); the UE in the present disclosure receives a signal on the first RE set and performs decoding according to a DCI format and CCE AL corresponding to the first signaling, and determines that the decoding is correct according to a CRC bit.

In one embodiment, the phrase that the first signaling corresponds to a DCI blind decoding of the M1 DCI blind decoding(s) comprises that the first signaling is transmitted in the M1 RE set(s) and an RE set corresponding to the DCI blind decoding of the M1 DCI blind decoding(s).

In one embodiment, the phrase that the first signaling corresponds to a DCI blind decoding of the M1 DCI blind decoding(s) comprises that a DCI format corresponding to the DCI blind decoding of the M1 DCI blind decoding(s) is a DCI format corresponding to the first signaling.

In one embodiment, the phrase that the first signaling corresponds to a DCI blind decoding of the M1 DCI blind decoding(s) comprises that a CCE AL corresponding to the DCI blind decoding of the M1 DCI blind decoding(s) is a CCE AL corresponding to the first signaling.

In one embodiment, the phrase that the first signaling corresponds to a DCI blind decoding of the M1 DCI blind decoding(s) comprises that a target receiver of the first signaling receives the first signaling through the DCI blind decoding of the M1 DCI blind decoding(s).

Embodiment 21

Figure 21:
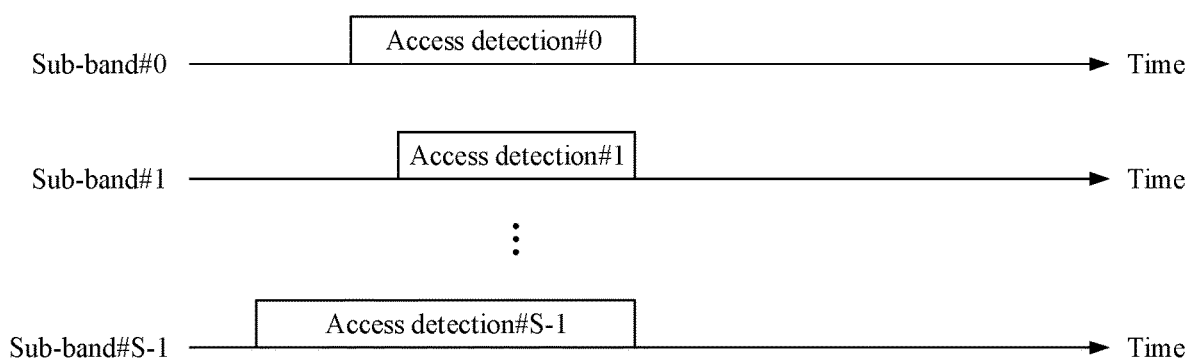
FIG. 21 illustrates a schematic diagram of S access detection(s) according to one embodiment of the present disclosure.

Embodiment 21 illustrates a schematic diagram of S access detection(s); as shown in FIG. 21.

In Embodiment 21, the S access detection(s) is(are) respectively performed on the S sub-band(s) in the present disclosure, and the S access detection(s) is(are) respectively used for determining whether the S sub-band(s) can be used for transmitting a radio signal. S1 access detection(s) of the S access detection(s) is(are) respectively used for determining that the S1 sub-band(s) in the present disclosure can be used for transmitting a radio signal, the S1 access detection(s) respectively being performed on the S1 sub-band(s). The S access detection(s) is(are) performed independently. In FIG. 21, index(es) of the S sub-band(s) and the S access detection(s) is(are) #0, #1 . . . , and #S−1, respectively.

In one embodiment, the S access detection(s) is(are) respectively used for determining whether the S sub-band(s) is(are) idle.

In one embodiment, S1 access detection(s) of the S access detection(s) is(are) respectively used for determining that each of the S1 sub-band(s) is idle, the S1 access detection(s) being respectively performed on the S1 sub-band(s).

In one embodiment, S−S1 access detection(s) of the S access detections is(are) respectively used for determining that none of S−S1 sub-band(s) can be used for transmitting a radio signal; the S–S1 sub-band(s) is(are) composed of sub-band(s) of the S sub-bands other than the S1 sub-band(s), the S–S1 access detection(s) being respectively performed on the S–S1 sub-band(s).

In one embodiment, S–S1 access detection(s) of the S access detections is(are) respectively used for determining that each of S–S1 sub-band(s) is non-idle; the S–S1 sub-band(s) is(are) composed of sub-band(s) of the S sub-bands other than the S1 sub-band(s), the S–S1 access detection(s) being respectively performed on the S–S1 sub-band(s).

In one embodiment, an end time for the S access detection(s) is no later than a start time for the first time-domain resource in the present disclosure.

In one embodiment, the S access detection(s) is(are) Listen Before Talk(s) (LBT) respectively; for the specific meaning and implementation method of LBT, refer to 3GPP TR36.889.

In one embodiment, the S access detection(s) is(are) Clear Channel Assessment(s) (CCA) respectively; for the specific meaning and implementation method of CCA, refer to 3GPP TR36.889.

In one embodiment, the S access detection(s) is(are) respectively implemented in a way defined by 3GPP TS36.213, section 15.

In one embodiment, the S access detection(s) is(are) respectively Downlink Channel access procedure(s); for the specific meaning and implementation method of the Downlink Channel access procedure, refer to 3GPP TS36.213, section 15.1.

In one embodiment, the S access detection(s) is(are) respectively Category 4 LBT(s).

In one embodiment, at least one of the S access detection(s) is a Category 4 LBT.

In one embodiment, the S access detection(s) is(are) respectively Category 2 LBT(s).

In one embodiment, at least one of the S access detection(s) is a Category 2 LBT.

In one embodiment, for the specific meaning and implementation method of the Category 4 LBT, refer to 3GPP TR36.889.

In one embodiment, for the specific meaning and implementation method of the Category 2 LBT, refer to 3GPP TR36.889.

In one embodiment, any of the S access detection(s) is a sub-band channel access detection.

In one embodiment, any two access detections of the S access detections have a same end time.

In one embodiment, counters N corresponding to any two access detections of the S access detections are independent from each other; for the specific meaning of the counter N, refer to 3GPP TS36.213 (V14.1.0), section 15.1.1.

In one embodiment, when the base station in the present disclosure stops transmitting on any given sub-band of the S sub-bands, for any given access detection of the S access detections other than an access detection corresponding to the given sub-band, the base station waits for 4Tsl or reinitializes a counter N corresponding to the given access detection before continuing to reduce a counter N corresponding to the given access detection once an idle slot is detected.

Embodiment 22

Figure 22:
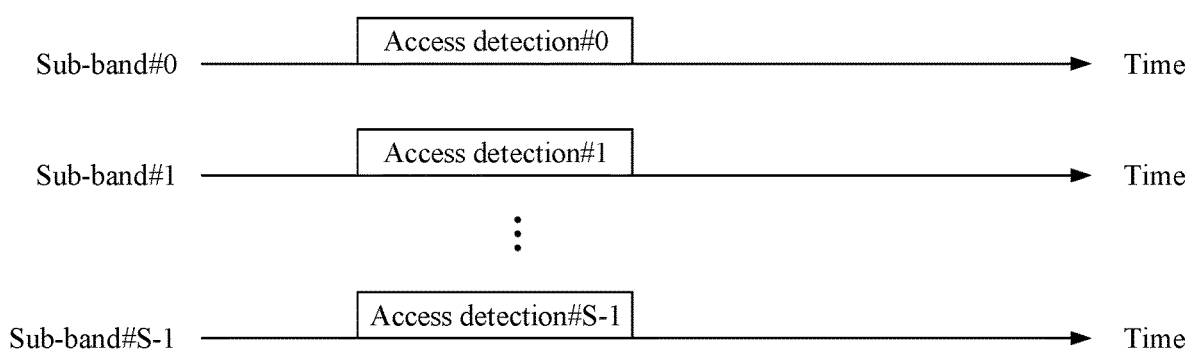
FIG. 22 illustrates a schematic diagram of S access detection(s) according to one embodiment of the present disclosure.

Embodiment 22 illustrates a schematic diagram of S access detection(s); as shown in FIG. 22.

In Embodiment 22, the S access detection(s) is(are) performed independently.

In one embodiment, each of the S access detection(s) corresponds to an equal counter N, for the specific meaning of the counter N, refer to 3GPP TS36.213 (V14.1.0), section 15.1.1.

In one embodiment, each of the S access detections corresponds to a counter N equal to a reference counter, the reference counter being a counter N corresponding to one of the S access detections that corresponds to a sub-band having a maximum $CW_p$ out of the S sub-bands.

In one embodiment, the $CW_p$ refers to contention window size, for the specific meaning of the $CW_p$, refer to 3GPP TS36.213, section 15.

In one embodiment, when the base station in the present disclosure stops transmitting on any given sub-band of the S sub-band(s), the base station reinitializes a counter N corresponding to each of the S access detection(s).

Embodiment 23

Figure 23:
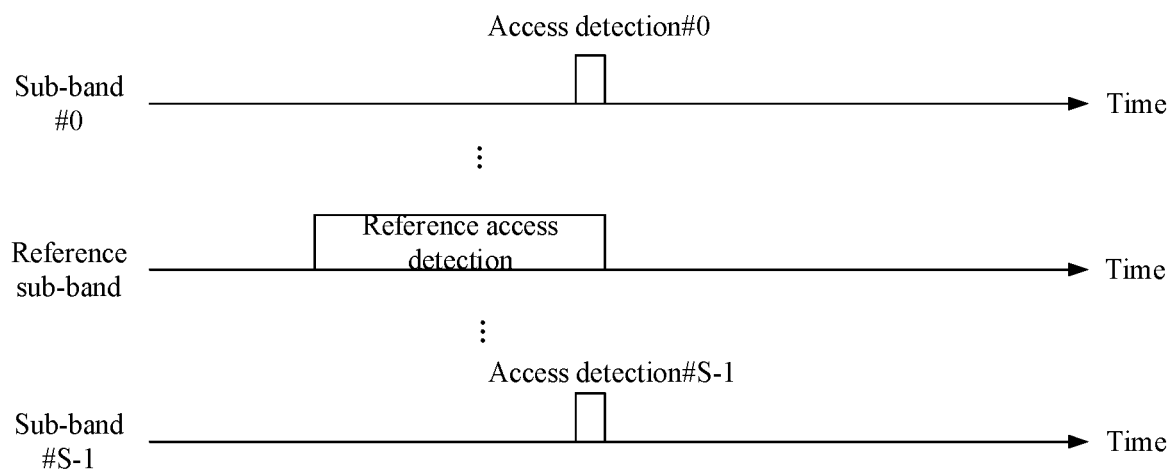
FIG. 23 illustrates a schematic diagram of S access detection(s) according to one embodiment of the present disclosure.

Embodiment 23 illustrates a schematic diagram of S access detection(s); as shown in FIG. 23.

In Embodiment 23, whether any sub-band of the S sub-band(s) can be used for transmitting a radio signal is related to a reference access detection, the reference access detection is one of the S access detection(s) corresponding to a reference sub-band, the reference sub-band being one of the S sub-band(s).

In one embodiment, only one access detection of the S access detection(s) is a Category 4 LBT.

In one embodiment, at least one of the S access detection(s) is a Category 2 LBT.

In one embodiment, each of S–1 access detection(s) of the S access detections is a Category 2 LBT.

In one embodiment, the reference access detection is a Category 4 LBT.

In one embodiment, there is at least one given sub-band in the S sub-bands, whether the given sub-band can be used for transmitting a radio signal is related to one of the S access detections other than an access detection corresponding to the given sub-band.

In one embodiment, any of the S access detections other than the reference access detection is a Category 2 LBT.

In one embodiment, whether the reference sub-band can be used for transmitting a radio signal is only related to the reference access detection of the S access detections.

In one embodiment, if the reference access detection determines that the reference sub-band is idle, the reference sub-band can be used for transmitting a radio signal; if the reference access detection determines that the reference sub-band is non-idle, the reference sub-band cannot be used for transmitting any radio signal.

In one embodiment, for any given sub-band of the S sub-bands other than the reference sub-band, the reference access detection and an access detection corresponding to the given sub-band are jointly used for determining whether the given sub-band can be used for transmitting a radio signal.

In one embodiment, for any given sub-band of the S sub-bands other than the reference sub-band, if the reference access detection determines that the reference sub-band is idle, and an access detection corresponding to the given sub-band determines that the given sub-band is idle, the given sub-band can be used for transmitting a radio signal.

In one embodiment, for any given sub-band of the S sub-bands other than the reference sub-band, if the reference access detection determines that the reference sub-band can be used for transmitting a radio signal, and an access detection corresponding to the given sub-band determines that the given sub-band is idle, the given sub-band can be used for transmitting a radio signal.

In one embodiment, for any given sub-band of the S sub-bands other than the reference sub-band, if the reference access detection determines that the reference sub-band is non-idle, the given sub-band cannot be used for transmitting a radio signal.

In one embodiment, for any given sub-band of the S sub-bands other than the reference sub-band, if the reference access detection determines that the reference sub-band cannot be used for transmitting a radio signal, the given sub-band cannot be used for transmitting a radio signal.

In one embodiment, for any given sub-band of the S sub-bands other than the reference sub-band, if the reference access detection determines that the reference sub-band can be used for transmitting a radio signal, and an access detection corresponding to the given sub-band determines that the given sub-band is idle within 25 µs prior to the reference sub-band transmitting a radio signal, the given sub-band can be used for transmitting a radio signal.

In one embodiment, for any given sub-band of the S sub-bands other than the reference sub-band, if an access detection corresponding to the given sub-band determines that the given sub-band is non-idle, the given sub-band cannot be used for transmitting a radio signal.

In one embodiment, for any given sub-band of the S sub-bands other than the reference sub-band, if an access detection corresponding to the given sub-band determines that the given sub-band is non-idle within 25 µs prior to the reference sub-band transmitting a radio signal, it is determined that the given sub-band cannot be used for transmitting a radio signal.

In one embodiment, for any given sub-band of the S sub-bands other than the reference sub-band, an access detection corresponding to the given sub-band ends at a same time as the reference access detection.

In one embodiment, the reference sub-band is selected by the base station in the present disclosure at random from the S sub-bands.

In one embodiment, the base station selects any of the S sub-bands as the reference sub-band at equal probability.

In one embodiment, any sub-band of the S sub-bands shan't be selected as the reference sub-band multiple times in 1 s.

In one embodiment, the S sub-bands share an equal $CW_p$.

In one embodiment, $CW_p$s corresponding to the S sub-bands are mutually independent.

Embodiment 24

Figure 24:
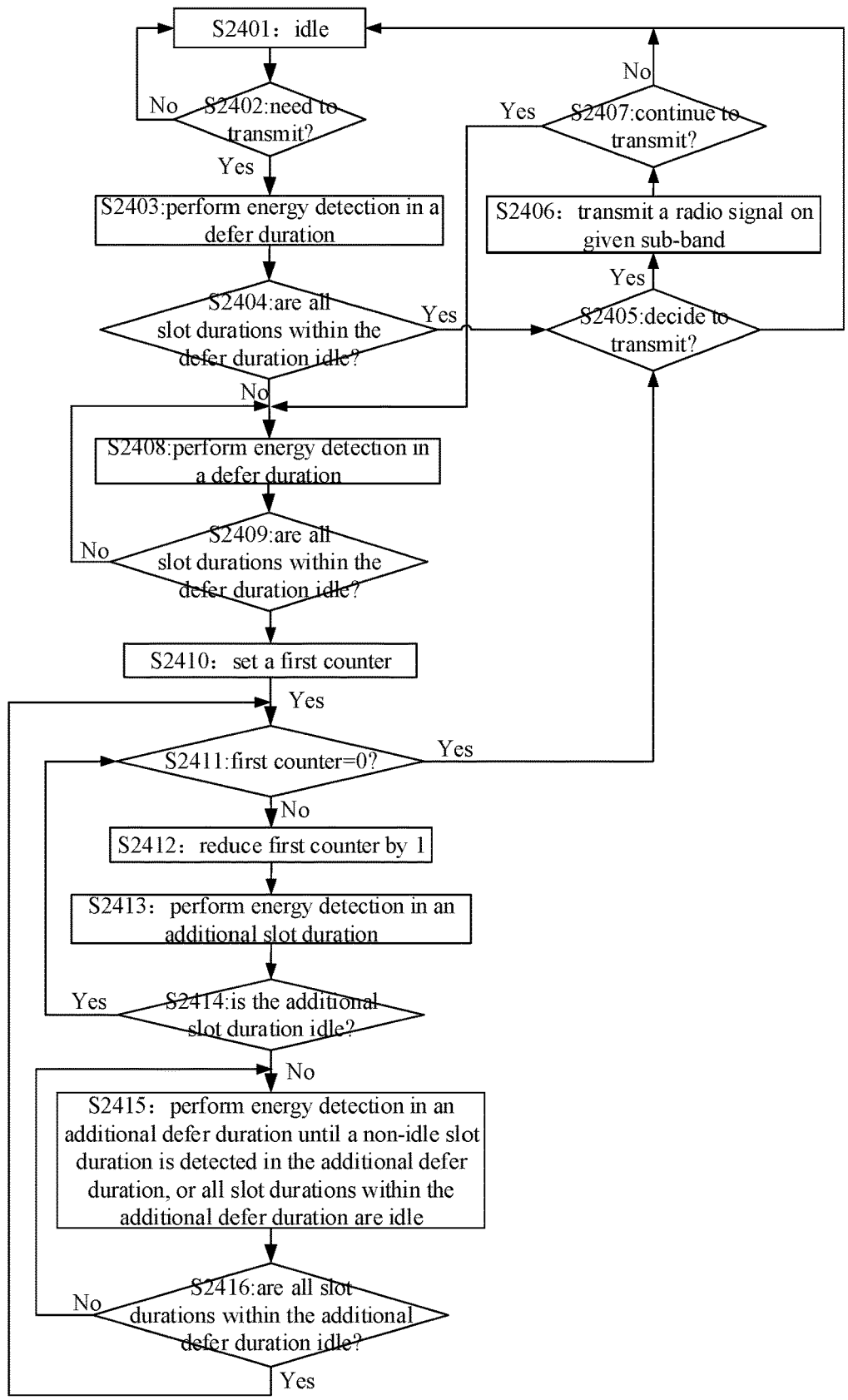
FIG. 24 illustrates a flowchart of a given access detection of S access detection(s) according to one embodiment of the present disclosure.

Embodiment 24 illustrates a flowchart of a given access detection of S access detection(s); as shown in FIG. 24.

In Embodiment 24, the given access detection is one of the S access detection(s), and the given access detection is performed on a given sub-band of the S sub-band(s) in the present disclosure. The process of the given access detection can be depicted by a flowchart in FIG. 24. The base station in the present disclosure is idle in step S2401, and determines whether there is need to transmit in step S2402, if yes, move forward to step S2403, otherwise return to step S2401; performs energy detection in a defer duration on the given sub-band in step S2403; and determines in step S2404 whether all slot durations within the defer duration are idle, if yes, move forward to step S2405, otherwise move forward to step S2408; determines whether to transmit in step S2405, if yes, move forward to step S2406, otherwise go back to step S2401; transmits a radio signal on the given sub-band in step S2406; and determines in step S2407 whether to continue to transmit, if yes, move forward to step S2408, otherwise go back to step S2401; performs energy detection in a defer duration on the given sub-band in step S2408; and determines whether all slot durations in the defer duration are idle in step S2409, if yes, move forward to step S2410, otherwise go back to step S2408; sets a first counter in step S2410; and determines in step S2411 whether the first counter is equal to 0, if yes, go back to step S2405, otherwise move forward to step S2412; and reduces the first counter by 1 in step S2412; performs energy detection in an additional slot duration on the given sub-band in step S2413; and determines in step S2414 whether the additional slot duration is idle, if yes, return to step S2411, otherwise move forward to step S2415; performs energy detection in an additional defer duration on the given sub-band in step S2415 till a non-idle slot duration is detected in the additional defer duration, or all slot durations within the additional defer duration are idle; and determines in step S2416 whether all slot durations within the additional defer duration are idle, if yes, go back to step S2411; otherwise return to step S2415.

In one embodiment, for the specific meaning of delay duration, slot duration, additional slot duration and additional defer duration in FIG. 24, refer to 3GPP TS36.213, section 15.

In one embodiment, performing energy detection in a given duration refers to performing energy detection in all slot durations within the given duration; the given duration is any duration among all defer durations in step S2403 and step S2408, all additional slot durations in step S2413, and all additional defer durations in step S2415 in FIG. 24.

In one embodiment, performing energy detection in a slot duration refers to sensing power of a radio signal in a given time unit and then averaging in time to acquire a received power; the given time unit is a consecutive period in the slot duration.

In one embodiment, performing energy detection in a slot duration refers to sensing energy of a radio signal in a given time unit and then averaging in time to acquire a received energy; the given time unit is a consecutive period in the slot duration.

In one embodiment, a slot duration being idle means sensing power of a radio signal in a given time unit and averaging in time, through which a received power obtained is lower than a reference threshold; the given time unit is a consecutive period in the slot duration.

In one embodiment, a slot duration being idle means sensing energy of a radio signal in a given time unit and averaging in time, through which a received energy obtained is lower than a reference threshold; the given time unit is a consecutive period in the slot duration.

In one embodiment, the given time unit lasts no shorter than 4 µs.

In one embodiment, a defer duration lasts (16+Q1*9) µs, Q1 being a positive integer.

In one subembodiment, Q1 belongs to 1, 2, 3 and 7.

In one embodiment, a defer duration comprises multiple slot durations.

In one subembodiment, a first slot duration and a second slot duration of the multiple slot durations are non-consecutive.

In one subembodiment, a first slot duration and a second slot duration of the multiple slot durations are spaced by a time interval of 7 ms.

In one embodiment, a defer duration lasts as long as an additional defer duration.

In one embodiment, a slot duration lasts 9 μs.

In one embodiment, an additional slot duration lasts as long as a slot duration.

In one embodiment, a value of the first counter set in step S2408 is one of P candidate integers.

In one embodiment, the P is one of 3, 7, 15, 31, 63, 127, 255, 511 and 1023.

In one embodiment, the P is a $CW_p$ in Category 4 LBT process.

In one embodiment, the P candidate integers are 0, 1, 2 . . . and P−1.

In one embodiment, the base station selects a candidate integer from the P candidate integers at random as a value set for the first counter.

In one embodiment, any of the P candidate integers is selected as a value set for the first counter at equal probability.

In one embodiment, the given access detection is any access detection of the S access detection(s).

In one embodiment, the given access detection is the reference access detection in Embodiment 23.

Embodiment 25

Figure 25:
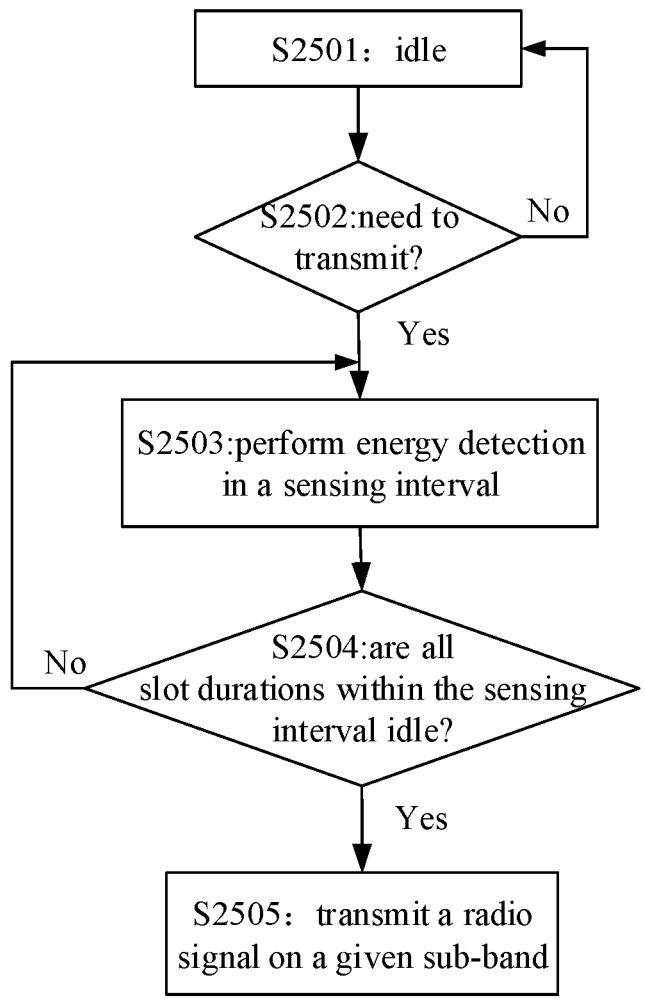
FIG. 25 illustrates a flowchart of a given access detection of S access detection(s) according to one embodiment of the present disclosure.

Embodiment 25 illustrates a flowchart of a given access detection of S access detection(s); as shown in FIG. 25.

In Embodiment 25, the given access detection is one of the S access detection(s), and the given access detection is performed on a given sub-band of the S sub-band(s) in the present disclosure. The process of the given access detection can be depicted by a flowchart in FIG. 25. The base station in the present disclosure is idle in step S2501, and determines whether there is need to transmit in step S2502, if yes, move forward to step S2503, otherwise go back to step S2501; performs energy detection in a sensing interval on the given sub-band in step S2503; and determines in step S2504 whether all slot durations within the sensing interval are idle, if yes, move forward to step S2505, otherwise return to step S2503; and transmits a radio signal on the given sub-band in step S2505.

In one embodiment, the specific definition of the sensing interval and slot duration in FIG. 25 can be found in 3GPP TS36.213, section 15.2.

In one embodiment, performing energy detection in a sensing interval refers to performing energy detection in all slot durations in the sensing interval.

In one embodiment, a sensing interval lasts 25 μs.

In one embodiment, a sensing interval comprises 2 slot durations, the 2 slot durations being non-consecutive in time domain.

In one subembodiment, a time interval between the 2 slot durations is 7 μs.

In one embodiment, the given access detection is any access detection of the S access detection(s).

Embodiment 26

Figure 26:
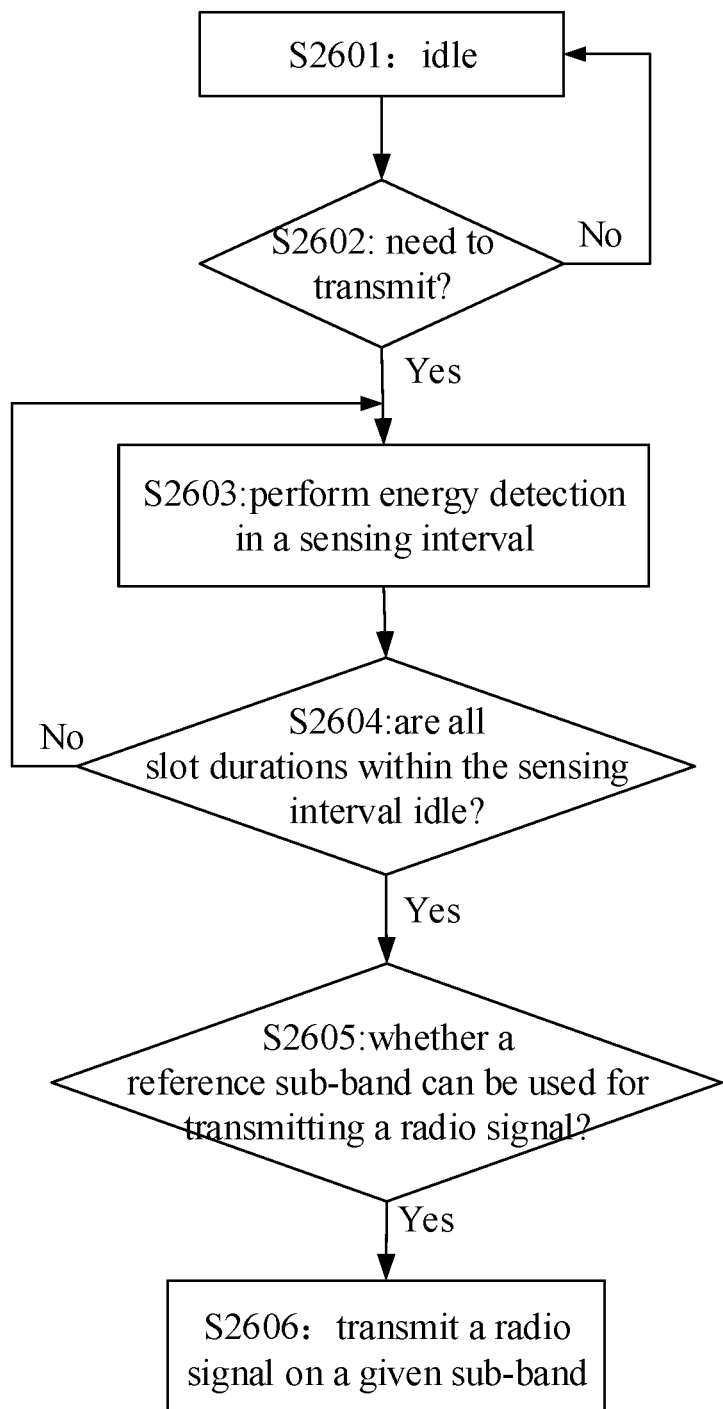
FIG. 26 illustrates a flowchart of a given access detection of S access detection(s) according to one embodiment of the present disclosure.

Embodiment 26 illustrates a flowchart of a given access detection of S access detection(s); as shown in FIG. 26.

In Embodiment 26, the given access detection is one of the S access detection(s), and the given access detection is performed on a given sub-band of the S sub-band(s) in the present disclosure. The process of the given access detection can be depicted by a flowchart in FIG. 26. The base station in the present disclosure is idle in step S2601, and determines whether there is need to transmit in step S2602, if yes, move forward to step S2603, otherwise go back to step S2601; performs energy detection in a sensing interval on the given sub-band in step S2603; and determines in step S2604 whether all slot durations within the sensing interval are idle, if yes, move forward to step S2605, otherwise return to step S2603; determines whether the reference sub-band in Embodiment 23 can be used for transmitting a radio signal in step S2605, if yes, move forward to step S2606; and transmits a radio signal on the given sub-band in step S2606.

In one embodiment, the given access detection is any one of the S access detections other than the reference access detection in Embodiment 23.

Embodiment 27

Figure 27:
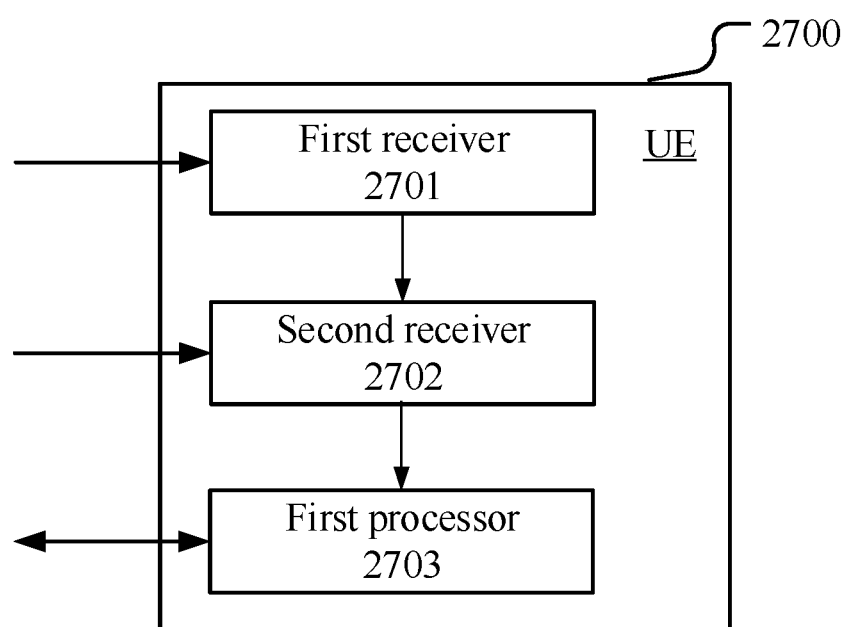
FIG. 27 illustrates a structure block diagram of a processing device in a UE according to one embodiment of the present disclosure.

Embodiment 27 illustrates a structure block diagram of a processing device in a UE; as shown in FIG. 27. In FIG. 27, a UE's processing device 2700 is composed of a first receiver 2701, a second receiver 2702 and a first processor 2703.

In Embodiment 27, the first receiver 2701 receives first information, the first information being used for indicating M DCI blind decoding(s); the second receiver 2702 monitors a first-type radio signal respectively on each sub-band of S sub-band(s) in a first time-domain resource; the first processor 2703 performs at most M1 DCI blind decoding(s) of M DCI blind decoding(s) on the S sub-band(s) in the first time-domain resource.

In Embodiment 27, the first-type radio signal detected on the S sub-band(s) is used for determining the M1 DCI blind decoding(s) out of the M DCI blind decoding(s); M is a positive integer, M1 is a positive integer no greater than M, and S is a positive integer.

In one embodiment, the first information is used for indicating N RE pool(s), any of the N RE pool(s) comprising a positive integer number of RE(s); M RE set(s) is(are) respectively reserved for the M DCI blind decoding(s), and any RE set of the M RE set(s) belongs to one of the N RE pool(s); the M1 DCI blind decoding(s) is(are) respectively performed in M1 RE set(s) of the M RE set(s); any RE set of the M RE set(s) comprises a positive integer number of RE(s); N is a positive integer.

In one embodiment, the second receiver 2702 detects the first-type radio signal only on S1 sub-band(s) of the S sub-band(s) in the first time-domain resource; herein, frequency resources occupied by any RE set of the M1 RE set(s) belong to the S1 sub-band(s); S1 being a positive integer no greater than S.

In one embodiment, the S1 sub-band(s) is(are) used for determining the M1 DCI blind decoding(s) out of the M DCI blind decoding(s).

In one embodiment, the first-type radio signal detected on the S sub-band(s) comprises a first sequence; the first sequence is used for determining the M1 DCI blind decoding(s) out of the M DCI blind decoding(s).

In one embodiment, any RE set of the M1 RE set(s) belongs to N1 RE pool(s) of the N RE pool(s); the first-type radio signal detected on the S sub-band(s) is used for determining the N1 RE pool(s) out of the N RE pool(s), N1 being a positive integer no greater than N.

In one embodiment, any RE set of the M1 RE set(s) belongs to N1 RE pool(s) of the N RE pool(s); the first-type radio signal detected on the S sub-band(s) is used for determining a number of RE set(s) comprised in each of the N1 RE pool(s) that belongs(belong) to the M1 RE set(s); N1 is a positive integer no greater than N.

In one embodiment, any RE set of the M1 RE set(s) belongs to N1 RE pool(s) of the N RE pool(s); the first-type radio signal detected on the S sub-band(s) is used for determining the N1 RE pool(s) out of the N RE pool(s), and for determining a number of RE set(s) comprised in each of the N1 RE pool(s) that belongs(belong) to the M1 RE set(s); N1 is a positive integer no greater than N.

In one embodiment, the first processor 2703 receives a first signaling; herein, the first signaling is received through a DCI blind decoding of the M1 DCI blind decoding(s).

In one embodiment, the first processor 2703 receives a second radio signal; herein, the first signaling comprises scheduling information of the second radio signal.

In one embodiment, the first processor 2703 transmits a second radio signal; herein, the first signaling comprises scheduling information of the second radio signal.

In one embodiment, the first receiver 2701 comprises at least one of the antenna 452, the receiver 454, the receiving processor 456, the channel decoder 458, the controller/processor 459, the memory 460 or the data source 467 in Embodiment 4.

In one embodiment, the second receiver 2702 comprises at least one of the antenna 452, the receiver 454, the receiving processor 456, the channel decoder 458, the controller/processor 459, the memory 460 or the data source 467 in Embodiment 4.

In one embodiment, the first processor 2703 comprises at least one of the antenna 452, the transmitter/receiver 454, the transmitting processor 468, the receiving processor 456, the channel encoder 457, the channel decoder 458, the controller/processor 459, the memory 460 or the data source 467 in Embodiment 4.

Embodiment 28

Figure 28:
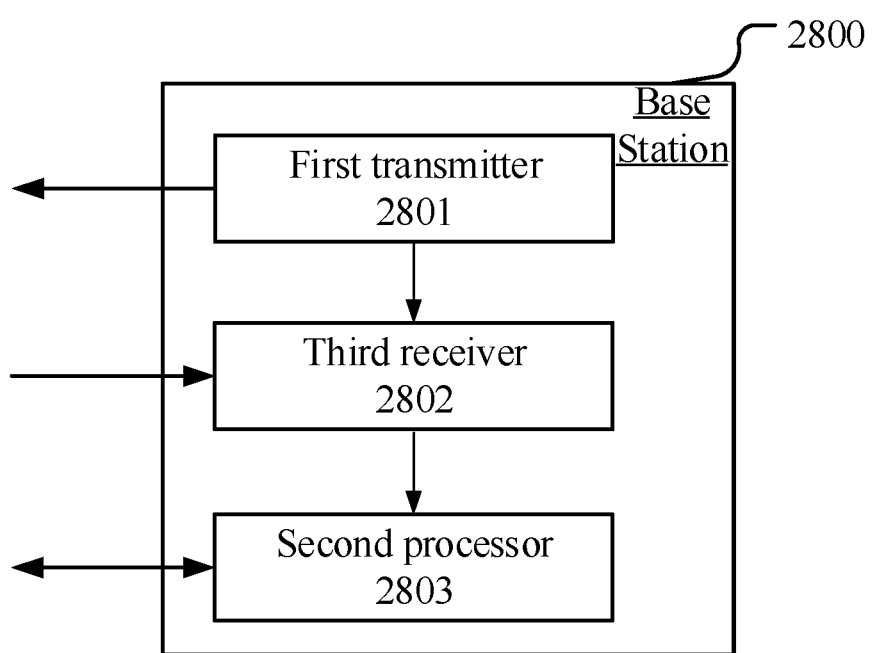
FIG. 28 illustrates a structure block diagram of a processing device in a base station according to one embodiment of the present disclosure.

Embodiment 28 illustrates a structure block diagram of a processing device in a base station; as shown in FIG. 28. In FIG. 28, a base station's processing device 2800 is composed of a first transmitter 2801, a third receiver 2802 and a second processor 2803.

In Embodiment 28, the first transmitter 2801 transmits first information, the first information being used for indicating M DCI blind decoding(s); the third receiver 2802 performs S access detection(s) respectively on S sub-band(s), the S access detection(s) being used for determining S1 sub-band(s) out of the S sub-band(s); the second processor 2803 transmits a first-type radio signal only on the S1 sub-band(s) of the S sub-band(s) respectively in a first time-domain resource.

In Embodiment 28, a target receiver of the first information performs at most M1 DCI blind decoding(s) of the M DCI blind decoding(s) on the S sub-band(s) in the first time-domain resource; the first-type radio signal is used for determining the M1 DCI blind decoding(s) out of the M DCI blind decoding(s); M and S are positive integers respectively, while M1 and S1 are positive integers respectively no greater than M and S.

In one embodiment, the first information is used for indicating N RE pool(s), any of the N RE pool(s) comprising a positive integer number of RE(s); M RE set(s) is(are) respectively reserved for the M DCI blind decoding(s), and any RE set of the M RE set(s) belongs to one of the N RE pool(s); the M1 DCI blind decoding(s) is(are) respectively performed in M1 RE set(s) of the M RE set(s); any RE set of the M RE set(s) comprises a positive integer number of RE(s); N is a positive integer.

In one embodiment, frequency resources occupied by any RE set of the M1 RE set(s) belong to the S1 sub-band(s).

In one embodiment, the S1 sub-band(s) is(are) used for determining the M1 DCI blind decoding(s) out of the M DCI blind decoding(s).

In one embodiment, the first-type radio signal comprises a first sequence; the first sequence is used for determining the M1 DCI blind decoding(s) out of the M DCI blind decoding(s).

In one embodiment, any RE set of the M1 RE set(s) belongs to N1 RE pool(s) of the N RE pool(s); the first-type radio signal is used for determining the N1 RE pool(s) out of the N RE pool(s), N1 being a positive integer no greater than N.

In one embodiment, any RE set of the M1 RE set(s) belongs to N1 RE pool(s) of the N RE pool(s); the first-type radio signal is used for determining a number of RE set(s) comprised in each of the N1 RE pool(s) that belongs(belong) to the M1 RE set(s); N1 is a positive integer no greater than N.

In one embodiment, any RE set of the M1 RE set(s) belongs to N1 RE pool(s) of the N RE pool(s); the first-type radio signal is used for determining the N1 RE pool(s) out of the N RE pool(s), and for determining a number of RE set(s) comprised in each of the N1 RE pool(s) that belongs (belong) to the M1 RE set(s); N1 is a positive integer no greater than N.

In one embodiment, the second processor 2803 transmits a first signaling; herein, the first signaling corresponds to a DCI blind decoding of the M1 DCI blind decoding(s).

In one embodiment, the second processor 2803 transmits a second radio signal; herein, the first signaling comprises scheduling information of the second radio signal.

In one embodiment, the second processor 2803 receives a second radio signal; herein, the first signaling comprises scheduling information of the second radio signal.

In one embodiment, the first transmitter 2801 comprises at least one of the antenna 420, the transmitter 418, the transmitting processor 416, the channel encoder 477, the controller/processor 475 or the memory 476 in Embodiment 4.

In one embodiment, the third receiver 2802 comprises at least one of the antenna 420, the receiver 418, the receiving processor 470, the channel decoder 478, the controller/processor 475 or the memory 476 in Embodiment 4.

In one embodiment, the second processor 2803 comprises at least one of the antenna 420, the transmitter/receiver 418, the transmitting processor 416, the receiving processor 470, the channel encoder 477, the channel decoder 478, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

The invention claimed is:

1. A method in a User Equipment (UE) for wireless communications, comprising:
   receiving first information, the first information being used for indicating M DCI blind decodings, and the first information comprising part of or all information in a PDCCH-Config IE;
   monitoring a first-type radio signal respectively on each sub-band of S sub-band(s) in a first time-domain resource; and
   performing at most M1 DCI blind decoding(s) of the M DCI blind decodings on the S sub-band(s) in the first time-domain resource;
   wherein the first-type radio signal detected on the S sub-band(s) is used for determining the M1 DCI blind decoding(s) out of the M DCI blind decodings; the first-type radio signal is transmitted on PDCCH; M is a positive integer, M1 is a positive integer no greater than M, and S is a positive integer; when S is larger than 1, the S sub-bands respectively correspond to different LBTs; the first-type radio signal is transmitted only in (a) sub-band(s) of the S sub-band(s) that has(have) passed LBT; the first time-domain resource comprises a COT (Channel Occupancy Time); the first information is used for indicating N RE pools, any of the N RE pools comprising a positive integer number of REs; the M DCI blind decodings are respectively performed in M RE sets, and any RE set of the M RE sets belongs to one of the N RE pools; the M1 DCI blind decoding(s) is(are) respectively performed in M1 RE set(s) of the M RE sets; any RE set of the M RE sets comprises a positive integer number of REs; N is a positive integer; the N RE pools are respectively N search space sets; the first information comprises second sub-information, the second sub-information indicating the N RE pools, the second sub-information comprises part of or all information in a searchSpacesToAddModList field of a PDCCH-Config IE; the M RE sets are respectively M PDCCH candidates; any RE set of the M1 RE set(s) belongs to N1 RE pool(s) of the N RE pools; the first-type radio signal detected on the S sub-band(s) is used for determining the N1 RE pool(s) out of the N RE pools, and for determining a number of RE set(s) comprised in each of the N1 RE pool(s) that belongs(belong) to the M1 RE set(s); N1 is a positive integer no greater than N; in the first time-domain resource, an end time for time resources occupied by the first-type radio signal is no later than a start time for time resources occupied by the M1 DCI blind decoding(s).

2. The method according to claim 1, wherein each of the S sub-band(s) is deployed at Unlicensed Spectrum, and the first information is UE-specific;
   or, any of the S sub-band(s) comprises a positive integer number of consecutive subcarriers in frequency domain;
   or, any two sub-bands of the S sub-bands are orthogonal in frequency domain, and there is a guard band between any two adjacent sub-bands of the S sub-bands in frequency domain;
   or, any of the S sub-band(s) is of a bandwidth of 20 MHz.

3. The method according to claim 1, wherein frequency resources occupied by any RE set of the M RE sets belong to one of the S sub-band(s), any RE pool of the N RE pools belongs to the S sub-band(s) in frequency domain;
   or, frequency resources occupied by any RE set of the M RE sets belong to one of the S sub-bands, any RE pool of the N RE pools belongs to the S sub-bands in frequency domain, frequency resources occupied by at least one of the N RE pools are distributed among multiple sub-bands of the S sub-bands.

4. The method according to claim 1, wherein at least two RE pools of the N RE pools are two search space sets in a same CORESET.

5. The method according to claim 1, wherein the N RE pools respectively correspond to N fourth indexes; the first-type radio signal detected on the S sub-band(s) is used for determining P4 candidate value(s), for any given RE pool of the N RE pools, when a fourth index for the given RE pool is equal to a candidate value of the P4 candidate value(s), the given RE pool is one of the N1 RE pool(s); and when a fourth index for the given RE pool is unequal to any of the P4 candidate value(s), the given RE pool is not one of the N1 RE pool(s); the N fourthindexes are SearchSpaceIds, respectively.

6. A method in a base station for wireless communications, comprising:
   transmitting first information, the first information being used for indicating M DCI blind decodings, and the first information comprising part of or all information in a PDCCH-Config IE;
   performing S access detection(s) respectively on S sub-band(s), the S access detection(s) being used for determining S1 sub-band(s) out of the S sub-band(s); and
   transmitting a first-type radio signal only on the S1 sub-band(s) of the S sub-band(s) respectively in a first time-domain resource;
   wherein a target receiver of the first information performs at most M1 DCI blind decoding(s) of the M DCI blind decodings on the S sub-band(s) in the first time-domain resource; the first-type radio signal is used for determining the M1 DCI blind decoding(s) out of the M DCI blind decodings; the first-type radio signal is transmitted on PDCCH; M and S are positive integers respectively, while M1 and S1 are positive integers respectively no greater than M and S; when S is larger than 1, the S sub-bands respectively correspond to different LBTs; the first-type radio signal is transmitted only in (a) sub-band(s) of the S sub-band(s) that has(have) passed LBT; the first time-domain resource comprises a COT (Channel Occupancy Time); the first information is used for indicating N RE pools, any of the N RE pools comprising a positive integer number of REs; the M DCI blind decodings are respectively performed in M RE sets, and any RE set of the M RE sets belongs to one of the N RE pools; the M1 DCI blind decoding(s) is(are) respectively performed in M1 RE set(s) of the M RE sets; any RE set of the M RE sets comprises a positive integer number of REs; N is a positive integer; the N RE pools are respectively N search space sets; the first information comprises second sub-information, the second sub-information indicating the N RE pools, the second sub-information comprises part of or all information in a searchSpacesToAddModList field of a PDCCH-Config IE; the M RE sets are respectively M PDCCH candidates; any RE set of the M1 RE set(s) belongs to N1 RE pool(s) of the N RE pools; the first-type radio signal detected on the S sub-band(s) is used for determining the N1 RE pool(s) out of the N RE pools, and for determining a number of RE set(s) comprised in each of the N1 RE pool(s) that belongs(belong) to the M1 RE set(s); N1 is a positive integer no greater than N; in the first time-domain resource, an end time for time resources occupied by the first-type radio signal is no later than a start time for time resources occupied by the M1 DCI blind decoding(s).

7. The method according to claim 6, wherein each of the S sub-band(s) is deployed at Unlicensed Spectrum, and the first information is UE-specific;
  or, any of the S sub-band(s) comprises a positive integer number of consecutive subcarriers in frequency domain;
  or, any two sub-bands of the S sub-bands are orthogonal in frequency domain, and there is a guard band between any two adjacent sub-bands of the S sub-bands in frequency domain;
  or, any of the S sub-band(s) is of a bandwidth of 20 MHz.

8. The method according to claim 6, wherein frequency resources occupied by any RE set of the M RE sets belong to one of the S sub-band(s), any RE pool of the N RE pools belongs to the S sub-band(s) in frequency domain;
  or, frequency resources occupied by any RE set of the M RE sets belong to one of the S sub-bands, any RE pool of the N RE pools belongs to the S sub-bands in frequency domain, frequency resources occupied by at least one of the N RE pools are distributed among multiple sub-bands of the S sub-bands.

9. The method according to claim 6, wherein at least two RE pools of the N RE pools are two search space sets in a same CORESET.

10. The method according to claim 6, wherein the N RE pools respectively correspond to N fourth indexes; the first-type radio signal detected on the S sub-band(s) is used for determining P4 candidate value(s), for any given RE pool of the N RE pools, when a fourth index for the given RE pool is equal to a candidate value of the P4 candidate value(s), the given RE pool is one of the N1 RE pool(s); and when a fourth index for the given RE pool is unequal to any of the P4 candidate value(s), the given RE pool is not one of the N1 RE pool(s); the N fourth indexes are SearchSpaceIds, respectively.

11. A UE for wireless communications, comprising:
  a first receiver, which receives first information, the first information being used for indicating M DCI blind decodings, and the first information comprising part of or all information in a PDCCH-Config IE;
  a second receiver, which monitors a first-type radio signal respectively on each sub-band of S sub-band(s) in a first time-domain resource; and
  a first processor, which performs at most M1 DCI blind decoding(s) of the M DCI blind decodings on the S sub-band(s) in the first time-domain resource;
  wherein the first-type radio signal detected on the S sub-band(s) is used for determining the M1 DCI blind decoding(s) out of the M DCI blind decodings; the first-type radio signal is transmitted on PDCCH; M is a positive integer, M1 is a positive integer no greater than M, and S is a positive integer; when S is larger than 1, the S sub-bands respectively correspond to different LBTs; the first-type radio signal is transmitted only in (a) sub-band(s) of the S sub-band(s) that has(have) passed LBT; the first time-domain resource comprises a COT (Channel Occupancy Time); the first information is used for indicating N RE pools, any of the N RE pools comprising a positive integer number of REs; the M DCI blind decodings are respectively performed in M RE sets, and any RE set of the M RE sets belongs to one of the N RE pools; the M1 DCI blind decoding(s) is(are) respectively performed in M1 RE set(s) of the M RE sets; any RE set of the M RE sets comprises a positive integer number of REs; N is a positive integer; the N RE pools are respectively N search space sets; the first information comprises second sub-information, the second sub-information indicating the N RE pools, the second sub-information comprises part of or all information in a searchSpacesToAddModList field of a PDCCH-Config IE; the M RE sets are respectively M PDCCH candidates; any RE set of the M1 RE set(s) belongs to N1 RE pool(s) of the N RE pools; the first-type radio signal detected on the S sub-band(s) is used for determining the N1 RE pool(s) out of the N RE pools, and for determining a number of RE set(s) comprised in each of the N1 RE pool(s) that belongs(belong) to the M1 RE set(s); N1 is a positive integer no greater than N; in the first time-domain resource, an end time for time resources occupied by the first-type radio signal is no later than a start time for time resources occupied by the M1 DCI blind decoding(s).

12. The UE according to claim 11, wherein each of the S sub-band(s) is deployed at Unlicensed Spectrum, and the first information is UE-specific;
  or, any of the S sub-band(s) comprises a positive integer number of consecutive subcarriers in frequency domain;
  or, any two sub-bands of the S sub-bands are orthogonal in frequency domain, and there is a guard band between any two adjacent sub-bands of the S sub-bands in frequency domain;
  or, any of the S sub-band(s) is of a bandwidth of 20 MHz.

13. The UE according to claim 11, wherein frequency resources occupied by any RE set of the M RE sets belong to one of the S sub-band(s), any RE pool of the N RE pools belongs to the S sub-band(s) in frequency domain;
  or, frequency resources occupied by any RE set of the M RE sets belong to one of the S sub-bands, any RE pool of the N RE pools belongs to the S sub-bands in frequency domain, frequency resources occupied by at least one of the N RE pools are distributed among multiple sub-bands of the S sub-bands.

14. The UE according to claim 11, wherein at least two RE pools of the N RE pools are two search space sets in a same CORESET.

15. The UE according to claim 11, wherein the N RE pools respectively correspond to N fourth indexes; the first-type radio signal detected on the S sub-band(s) is used for determining P4 candidate value(s), for any given RE pool of the N RE pools, when a fourth index for the given RE pool is equal to a candidate value of the P4 candidate value(s), the given RE pool is one of the N1 RE pool(s); and when a fourth index for the given RE pool is unequal to any of the P4 candidate value(s), the given RE pool is not one of the N1 RE pool(s); the N fourth indexes are SearchSpaceIds, respectively.

16. A base station for wireless communications, comprising:
- a first transmitter, which transmits first information, the first information being used for indicating M DCI blind decodings, and the first information comprising part of or all information in a PDCCH-Config IE;
- a third receiver, which performs S access detection(s) respectively on S sub-band(s), the S access detection(s) being used for determining S1 sub-band(s) out of the S sub-band(s); and
- a second processor, which transmits a first-type radio signal only on the S1 sub-band(s) of the S sub-band(s) respectively in a first time-domain resource;

wherein a target receiver of the first information performs at most M1 DCI blind decoding(s) of the M DCI blind decodings on the S sub-band(s) in the first time-domain resource; the first-type radio signal is used for determining the M1 DCI blind decoding(s) out of the M DCI blind decodings; the first-type radio signal is transmitted on PDCCH; M and S are positive integers respectively, while M1 and S1 are positive integers respectively no greater than M and S; when S is larger than 1, the S sub-bands respectively correspond to different LBTs; the first-type radio signal is transmitted only in (a) sub-band(s) of the S sub-band(s) that has(have) passed LBT; the first time-domain resource comprises a COT (Channel Occupancy Time); the first information is used for indicating N RE pools, any of the N RE pools comprising a positive integer number of REs; the M DCI blind decodings are respectively performed in M RE sets, and any RE set of the M RE sets belongs to one of the N RE pools; the M1 DCI blind decoding (s) is(are) respectively performed in M1 RE set(s) of the M RE sets; any RE set of the M RE sets comprises a positive integer number of REs; N is a positive integer; the N RE pools are respectively N search space sets; the first information comprises second sub-information, the second sub-information indicating the N RE pools, the second sub-information comprises part of or all information in a searchSpacesToAddModList field of a PDCCH-Config IE; the M RE sets are respectively M PDCCH candidates; any RE set of the M1 RE set(s) belongs to N1 RE pool(s) of the N RE pools; the first-type radio signal detected on the S sub-band(s) is used for determining the N1 RE pool(s) out of the N RE pools, and for determining a number of RE set(s) comprised in each of the N1 RE pool(s) that belongs(belong) to the M1 RE set(s); N1 is a positive integer no greater than N; in the first time-domain resource, an end time for time resources occupied by the first-type radio signal is no later than a start time for time resources occupied by the M1 DCI blind decoding(s).

17. The base station according to claim 16, wherein each of the S sub-band(s) is deployed at Unlicensed Spectrum, and the first information is UE-specific;
or, any of the S sub-band(s) comprises a positive integer number of consecutive subcarriers in frequency domain;
or, any two sub-bands of the S sub-bands are orthogonal in frequency domain, and there is a guard band between any two adjacent sub-bands of the S sub-bands in frequency domain;
or, any of the S sub-band(s) is of a bandwidth of 20 MHz.

18. The base station according to claim 16, wherein frequency resources occupied by any RE set of the M RE sets belong to one of the S sub-band(s), any RE pool of the N RE pools belongs to the S sub-band(s) in frequency domain;
or, frequency resources occupied by any RE set of the M RE sets belong to one of the S sub-bands, any RE pool of the N RE pools belongs to the S sub-bands in frequency domain, frequency resources occupied by at least one of the N RE pools are distributed among multiple sub-bands of the S sub-bands.

19. The base station according to claim 16, wherein at least two RE pools of the N RE pools are two search space sets in a same CORESET.

20. The base station according to claim 16, wherein the N RE pools respectively correspond to N fourth indexes; the first-type radio signal detected on the S sub-band(s) is used for determining P4 candidate value(s), for any given RE pool of the N RE pools, when a fourth index for the given RE pool is equal to a candidate value of the P4 candidate value(s), the given RE pool is one of the N1 RE pool(s); and when a fourth index for the given RE pool is unequal to any of the P4 candidate value(s), the given RE pool is not one of the N1 RE pool(s); the N fourth indexes are SearchSpaceIds, respectively.

* * * * *